United States Patent
Koury et al.

(10) Patent No.: US 12,304,376 B2
(45) Date of Patent: *May 20, 2025

(54) ROTATABLE CONDIMENT HOLDER

(71) Applicant: Milkmen Design, LLC, Richfield, OH (US)

(72) Inventors: Michael Koury, Medina, OH (US); William Moujaes, Akron, OH (US); Tony Lahood, Hinckley, OH (US)

(73) Assignee: MILKMEN DESIGN, LLC, Richfield, OH (US)

( * ) Notice: Subject to any disclaimer, the term of this patent is extended or adjusted under 35 U.S.C. 154(b) by 251 days.

This patent is subject to a terminal disclaimer.

(21) Appl. No.: 17/992,991

(22) Filed: Nov. 23, 2022

(65) Prior Publication Data

US 2023/0081496 A1     Mar. 16, 2023

Related U.S. Application Data

(63) Continuation-in-part of application No. 17/184,726, filed on Feb. 25, 2021, now Pat. No. 11,518,287,
(Continued)

(51) Int. Cl.
    B60N 3/10    (2006.01)
(52) U.S. Cl.
    CPC ............. B60N 3/103 (2013.01); B60N 3/107 (2013.01)
(58) Field of Classification Search
    CPC ..... B60R 2011/0059; B60R 2011/0008; B60R 2011/0042; Y10S 224/926; Y10S 229/904; B60N 3/103; B60N 3/108; B60N 3/107
    See application file for complete search history.

(56) References Cited

U.S. PATENT DOCUMENTS 3,866,873 A     2/1975  Bohli
4,256,281 A  *  3/1981  Harris ................... B60N 3/103
                                                    248/315
(Continued)

OTHER PUBLICATIONS

XxNiceThingsxX, Etsy.com, SauceBoss Dip Holder for Car | DipClip | McDonalds Dip Holder | Dip Clip UK | Sauce Boss | Hot Item!—UK Seller, https://www.etsy.com/listing/560494888/sauceboss-dip-holder-for-car-dipclip?ga_order=most_relevant&ga_search_type=all&ga_view_type=gallery&ga_search_query=dipclip&ref=sr_gallery_1, publication was accessible on Nov. 28, 2017, 4 pages.

(Continued)

*Primary Examiner* — Brian D Nash
(74) *Attorney, Agent, or Firm* — Sand, Sebolt & Wernow Co., LPA

(57) ABSTRACT

A condiment holder including a holding member and connector. The connector includes a clip with flexible teeth for gripping a support surface such as a vehicle air vent fin. The holding member is rotatable relative to the clip between first and second positions disposed at 180° to one another. When in the first position, a first surface of the holding member faces upwardly and when in the second position, a second surface faces upwardly. An interior wall of the holding member defines an aperture extending between the first and second surfaces. The interior wall includes at least three sets of opposed wall sections, each configured to engage a different one of a plurality of differently-shaped condiment containers. A retaining wall extends outwardly from the second surface. When the holding member is in the second position, another differently configured condiment container is receivable in a compartment bounded by the retaining wall.

20 Claims, 17 Drawing Sheets

Related U.S. Application Data which is a continuation of application No. 16/299,677, filed on Mar. 12, 2019, now Pat. No. 10,967,776.

(60) Provisional application No. 62/642,306, filed on Mar. 13, 2018.

(56) References Cited

U.S. PATENT DOCUMENTS

| | | | |
|---|---|---|---|
| 4,339,033 A | 7/1982 | Cillario | |
| 4,854,466 A | 8/1989 | Lane, Jr. | |
| 5,108,059 A | 4/1992 | Curtis | |
| D371,735 S | 7/1996 | Motta | |
| 5,667,119 A | 9/1997 | Florence | |
| 5,702,041 A | 12/1997 | Sun et al. | |
| 5,979,724 A | 11/1999 | Loewenthal, Jr. et al. | |
| 6,062,468 A * | 5/2000 | Tausanovitch | B65D 81/3205 220/359.2 |
| 6,152,302 A * | 11/2000 | Miller | B65D 77/04 206/549 |
| 6,189,489 B1 | 2/2001 | Pearce | |
| 6,193,201 B1 | 2/2001 | Babcock | |
| 6,196,434 B1 | 3/2001 | Angran et al. | |
| 6,216,946 B1 * | 4/2001 | Cai | B65D 81/3205 229/906 |
| D447,012 S | 8/2001 | Owens et al. | |
| 6,364,112 B1 | 4/2002 | Pitschka | |
| 6,401,927 B1 * | 6/2002 | Sorensen | B65D 5/5286 273/286 |
| 6,682,034 B1 | 1/2004 | Vial | |
| 8,109,235 B2 | 2/2012 | Lipscomb et al. | |
| 8,459,481 B2 | 6/2013 | Arkin | |
| D690,707 S * | 10/2013 | Minn | B60R 11/0241 D14/447 |
| D696,074 S | 12/2013 | Shamoon | |
| D701,424 S | 3/2014 | Shamoon | |
| 8,770,431 B1 | 7/2014 | Glasser et al. | |
| 9,296,324 B2 | 3/2016 | Mango | |
| 9,327,864 B2 | 5/2016 | Bell et al. | |
| D780,168 S * | 2/2017 | Du | D14/253 |
| 9,567,136 B2 | 2/2017 | Myoung et al. | |
| D783,593 S * | 4/2017 | Chen | D14/253 |
| D837,610 S | 1/2019 | Maguire | |
| D899,196 S | 10/2020 | Moujaes et al. | |
| 10,967,776 B2 | 4/2021 | Koury et al. | |
| 2002/0056743 A1 * | 5/2002 | Barcat | B65D 25/20 229/120.01 |
| 2007/0000922 A1 | 1/2007 | Vovan et al. | |
| 2009/0090712 A1 | 4/2009 | Vovan | |
| 2010/0065715 A1 * | 3/2010 | Fan | B60R 11/00 248/694 |
| 2011/0272546 A1 | 11/2011 | Nielsen | |
| 2012/0138648 A1 | 6/2012 | Moceo, II | |
| 2013/0119103 A1 | 5/2013 | Mango | |
| 2013/0200124 A1 | 8/2013 | Burwinkle et al. | |
| 2014/0021233 A1 | 1/2014 | Strole | |
| 2014/0034697 A1 | 2/2014 | Mak et al. | |
| 2014/0103087 A1 | 4/2014 | Fan | |
| 2014/0138418 A1 | 5/2014 | Dunn | |
| 2014/0138419 A1 | 5/2014 | Minn et al. | |
| 2014/0183238 A1 | 7/2014 | Lin | |
| 2014/0326768 A1 | 11/2014 | Mango | |
| 2015/0217697 A1 | 8/2015 | Peters | |
| 2015/0366388 A1 | 12/2015 | Goldstein | |
| 2017/0136960 A1 * | 5/2017 | Kim | F16M 13/022 |
| 2019/0283646 A1 * | 9/2019 | Koury | B60N 3/104 |
| 2021/0178951 A1 | 6/2021 | Moujaes et al. | |
| 2023/0081496 A1 * | 3/2023 | Koury | B60N 3/107 224/553 |

OTHER PUBLICATIONS

ImproperEngineering, Etsy.com, Sauce Buddy Dip Clip Adjustable The Original || Car Vent Holder Car Vent Sauce Holder Car Vent Clip Air Vent Sauce Holder DipClip, https://www.etsy.com/listing/573887405/sauce-buddy-dip-clip-the- original-sauce?ga_order=most_relevant&ga_search_type=all&ga_view_type=gallery&ga_search_query=dipclip&ref=sr_gallery_2, publication was accessible on Nov. 28, 2017, 4 pages.

PrintinTime3D, Etsy.com, Little Dipper || Dip Clip || Sauce Holder || Car Accessories || Dipclip || Car Vent Holder, https://www.etsy.com/listing/575082339/little-dipper-dip-clip-sauce-holder-car?ga_order=most_relevant&ga_search_type=all&ga_view_type=gallery&ga_search_query=dipclip&ref=sr_gallery_3, publication was accessible Nov. 28, 2017, 3 pages.

Thingiverse, CAR DipClip by darookee, https://www.thingiverse.com/thing:2662748, publication was accessible Nov. 28, 2017, 3 pages.

Thingiverse, CAR DipClip, Sauce holder for a car, Clips into air vent Vo.02 by JuXas, https://www.thingiverse.com/thing:2660990, publication was accessible Nov. 28, 2017, 3 pages.

12 WBOY.com, 'Fast Food Buddy' Invention Makes Eating On-the-Go Easier for Consumers, http://www.wvalways.com/story/26388108/fast-food-buddy-invention-makes-eating-on-the-go-easier-for-consumers, Posted Aug. 27, 2014, 2 pages.

FFB, Amazon.com, Bright Red Fast Food Buddy Dipping Sauce and Cup Holder, https://www.amazon.com/Bright-Buddy-Dipping-Sauce-Holder/dp/B01C9RPI4E, May 5, 2016, 4 pages.

Prepworks Dip Clip Set (Set of 4), Assorted Colors, https://www.walmart.com/ip/Prepworks-Dip-Clip-Set-Set-of-4-Assorted-Colors/28491881?wmlspartner=wlpa&selectedSellerId=0&adid=22222222227019047513&wl0=&wl1=g&wl2=c&wl3=52360689975&wl4=pla-79465779735&wl5-9015314&wl6=&wl7=&wl8=&wl9=pla_with_promotion&wl10-8175035&wl11=online&wl12=28491881&wl13=&veh=sem, publication was accessible Nov. 28, 2017, 4 pages.

Saucemoto: An in-car dip clip for ketchup and dipping sauces, Milkmen Design, LLC, https://www.kickstarter.com/projects/19375970/dipclip-a-cup-holder-for-yoursauce/ posts/2069086, published Dec. 11, 2017 ("Saucemoto Kickstarter").

https://www.youtube.com/watch?v=hblnz_2qgWA; Nov. 22, 2017 (Unable to retrieve from Internet as of Oct. 27, 2023).

UFC 50×50 Filter Slide, Baader Planetarium GmbH, Baader-Planetarium.com (via Archive.org), Date: May 25, 2017 ("Baader").

Now you can add your own custom name or any lettering to the front! #etsy shop: Double Dipper Dip Clip Sauce Holder; Author: 3DPrintedbyBrian; Source: Twitter.com; Etsy.com; Publication Date: Tweet dated Feb. 5, 2018 ("Double Dipper").

PVC Grommet A33GB from Optronics, Inc., Optronicsinc.com (via Archive.org), Apr. 9, 2017 ("Optronics").

Oct. 30, 2017: https://www.facebook.com/Saucemoto/videos/a-little-teaser-from-ourkickstarter-video-we-cant-wait-to-show-you-the-whole-th/593401321051297/—Unavailable to Retrieve on Internet Oct. 27, 2023.

Nov. 16, 2017—https://www.backerkit.com/projects/19375970/dipclip-a-cup-holder-for-your-sauce—Unavailable to Retrieve on Internet Oct. 27, 2023.

Jan. 2018—https://www.kickstarter.com/projects/19375970/dipclip-a-cup-holder-for-your-sauce—Unavailable to Retrieve on Internet Oct. 27, 2023.

Amazon.com. Saucemoto DipClip Front and Back Seat Pack-Car Sauce Holder for Vents and Windows. ASIN: B0CMJPJFZR date first available Nov. 3, 2023 (Year: 2023).

* cited by examiner

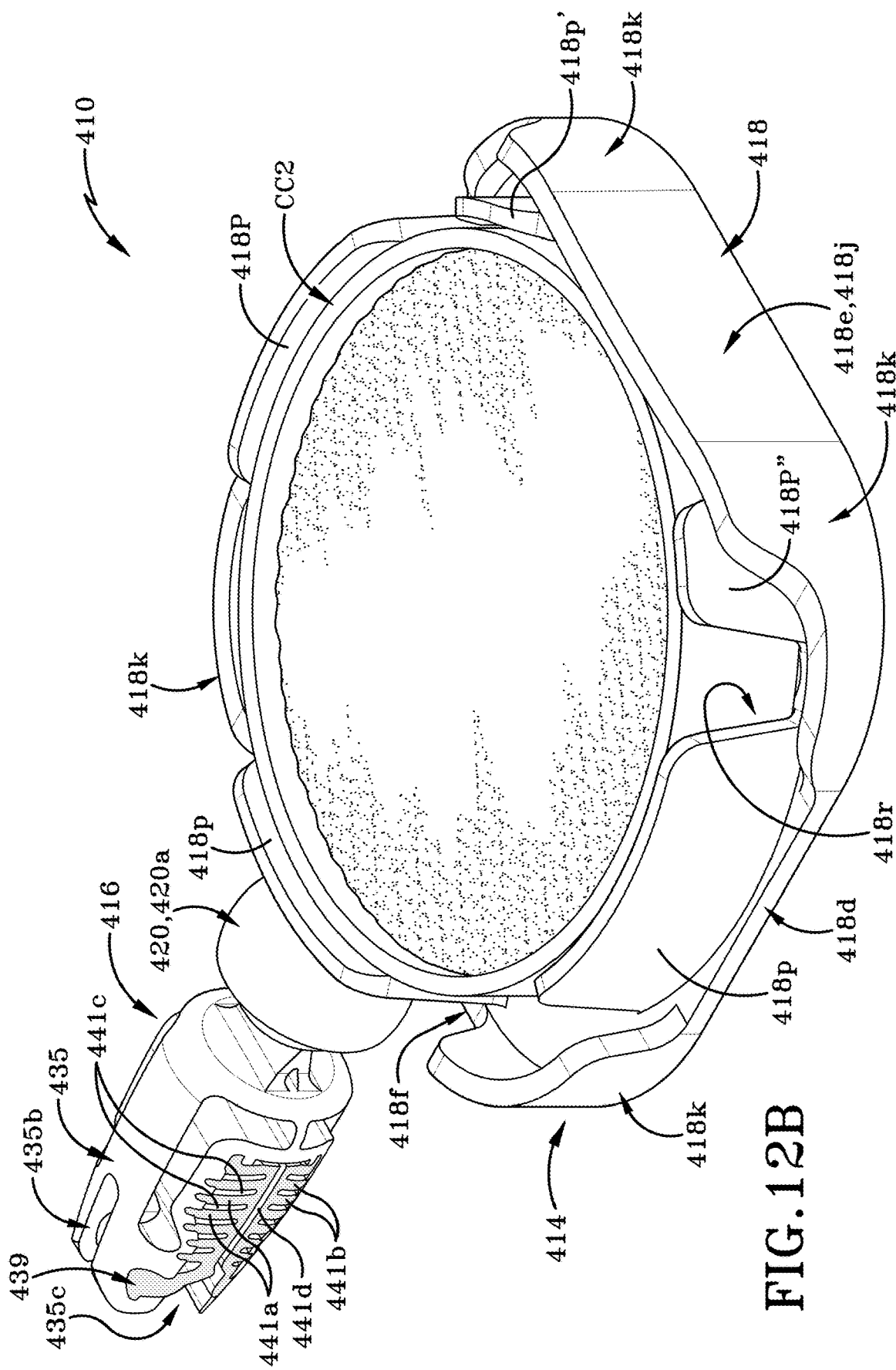

ROTATABLE CONDIMENT HOLDER

REFERENCE TO RELATED APPLICATIONS

This application is a Continuation-in-Part of U.S. patent application Ser. No. 17/184,726, filed Feb. 25, 2021, which is a Continuation of U.S. patent application Ser. No. 16/299,677 filed Mar. 12, 2019, now U.S. Pat. No. 10,967,776, which claims the benefit of U.S. Provisional Patent Application Ser. No. 62/642,306, filed Mar. 13, 2018, the entire disclosures of which are incorporated herein by reference.

TECHNICAL FIELD

The present application is generally directed to holding devices. More particularly, this application relates to a device suitable for holding condiment containers provided by fast-food restaurants or for receiving condiments provided by fast-food restaurants. Specifically, the application is directed to a condiment holder engageable with a support surface such as an air vent fin of a vehicle. The condiment holder includes a holding member in the form of a body which is rotatable between first and second positions disposed at 180° to one another in order to orient one of a first surface and a second surface to face upwardly. The first surface defines a specially-configured aperture into which one of a plurality of differently-configured condiment containers are able to be selectively individually engaged. A retaining wall extends outwardly from the second surface of the body and defines a compartment into which a condiment container of a further different configuration is able to be received.

BACKGROUND OF THE INVENTION

People frequently stop at fast-food restaurants while traveling and, instead of eating in the restaurant, take the food back to their vehicle for consumption. It is common for fast-food meals to be accompanied by a variety of condiments such as ketchup or dipping sauces that come in small flexible pouches or rigid condiment containers. Some of these condiment containers comprise a plastic base that defines a recess which holds the condiment. A peelable cover is engaged with the base and must be removed in order to access the condiment retained within the recess. These condiment containers are quite small, typically being around one inch long, one inch or less wide, and one inch or less deep.

Once the consumer has removed the cover, the condiment container is tilted so that the condiment in the recess is poured over the consumer's food. In other instances, the consumer may want to dip their food, such as fries or chicken nuggets for example, into the condiment held in the recess of the container in order to smother their food in the condiment. Holding a small condiment container and trying to dip food into the same can become a very messy experience.

As indicated above, other types of condiment container are simply a small plastic pouch that has to be torn open to access the quantity of condiment retained inside the pouch. Attempting to use these flexible pouches for dipping purposes or attempting to pour condiment from a flexible pouch onto food can, again, create quite a mess.

A number of solutions to this problem have been proposed in the prior art. U.S. Pat. Nos. 9,199,584 and 9,296,324 (Mango) disclose a holder for condiment packets, where the holder is engaged in a vehicle cup holder or air vent. The holder comprises a planar body that includes a cylindrical portion that defines an aperture therein and in which a condiment container is suspended. The body is between 3.5 inches and about 4.5 inches in size to make it suitable to rest on a flange surrounding a cup holder. The holder further includes an extension that protrudes from the cylindrical portion. The extension defines a slot therein and this slot is configured to receive a fin of a vehicle air vent therein and thereby hold the holder on the air vent. In some instances, the extension includes a projection to help retain the extension on a vehicle air vent. The condiment packet is held under slight compression within the aperture. U.S. Pat. No. 9,199,584 discloses separate holders for each of a plurality of differently-configured condiment packets. For example, for rectangularly-shaped condiment packets, the aperture defined in the cylindrical body of a first holder is rectangular in configuration. For square-shaped condiment packets, the aperture defined in the cylindrical body of a second holder is square in configuration. U.S. Pat. No. 9,296,324 discloses an embodiment of a condiment holder that is capable of selectively retaining each of two separate condiment packet shapes. A first condiment packet will be retained in a first orientation within the holder and a second differently-configured packet will be retained in a second orientation within the same holder.

SUMMARY OF THE INVENTION

There remains a need in the art for an improved condiment holder that is relatively easy for a consumer to use and access. The condiment holder and method disclosed herein addresses many of the shortcomings of the prior art.

A condiment holder including a holding member and a connector. The connector includes a clip and a ball and socket joint (also referred to herein as a "ball joint") located between the clip and holder. The clip of the connector includes flexible teeth for gripping a support surface such as a vehicle air vent fin. The holding member is rotatable about the ball joint between first and second positions disposed at 180° to one another. When in the first position, a first surface of the holding member faces upwardly and when in the second position, a second surface faces upwardly. An interior wall of the holding member defines an aperture extending between the first and second surfaces. The interior wall includes at least three sets of opposed wall sections, each configured to engage a different one of a plurality of differently-shaped condiment containers. A retaining wall extends outwardly from the second surface. When the holding member is in the second position, another differently configured condiment container is receivable in a compartment bounded by the retaining wall.

In one aspect, the present disclosure may provide a condiment holder comprising a holding member having a first surface and an opposed second surface; wherein the holding member is selectively orientable between a first position and a second position; an aperture defined by an interior wall of the holding member, said aperture extending between the first surface and the second surface; at least one retaining wall extending outwardly from the second surface of the holding member; wherein the at least one retaining wall bounds and defines a compartment, and wherein the at least one retaining wall at least partially circumscribes the aperture; wherein when the holding member is in the first position, the aperture and/or interior surface of the holding member is adapted to operatively engage a first condiment container having a first configuration; and wherein when the holding member is in the second position, the compartment defined by the at least one retaining wall is adapted to operatively engage a second condiment container having a second configuration, and the second configuration is different from the first configuration.

In one embodiment, the first position and the second position of the holding member may be disposed at 180° to one another and when the holding member is oriented in the first position the first surface is positioned vertically above the second surface, and when the holding member is rotated to the second position, the second surface is positioned vertically above the first surface. In one embodiment, the aperture may be of a first shape and the at least one retaining wall may be of a second shape, and the second shape differs from the first shape. In one embodiment, the at least one retaining wall may be spaced radially outwardly away from the interior wall such that a region of the second surface extends between the interior wall and the at least one retaining wall. In one embodiment, the aperture may be generally rectangular in shape and the at least one retaining wall may be generally circular in shape. In one embodiment, the at least one retaining wall may comprise at least two curved wall sections separated from one another by a gap, and wherein the at least two curved wall sections are concave in shape with respect to the interior wall.

In one embodiment the interior wall may define a set of first wall sections opposed to one another, and a set of second wall sections opposed to one another, and wherein the set of first wall sections is adapted to support part of the first condiment container having a first configuration; and wherein the set of second wall sections is adapted to support part of an additional condiment container having a different configuration from the first configuration. In one embodiment, the interior wall may further define a set of third wall sections opposed to one another, and wherein the set of third wall sections is adapted to support part of yet another additional condiment container having a different configuration from that of the additional condiment container and the first condiment container. In one embodiment, the interior wall may further defines a fourth wall section and an opposed fifth wall section, and wherein the fourth wall section and fifth wall section are adapted to support part of at least one other condiment container having another configuration different from that of the first condiment container, the additional condiment container, and the yet another additional condiment container.

In one embodiment, the condiment holder may further comprise a connector extending outwardly from the holding member, said connector being adapted to secure the holding member to a support surface (such as a fin of a vehicle air vent). In one embodiment, a ball joint may be interposed between the connector and the holding member, wherein the ball joint enables the holding member to be rotated relative to the connector. In one embodiment, the connector may comprise a housing defining an interior space; an insert receivable in the interior space of the housing; and a plurality of flexible teeth provided on the insert.

In another aspect, the present disclosure may provide a method of supporting a condiment container on a support surface comprising providing a condiment holder; engaging a connector of the condiment holder with the support surface; selecting one of a first surface and a second surface of a holding member of the condiment holder to face upwardly; facing the first surface of the holding member upwardly when a first condiment container to be engaged with the condiment holder is of a first exterior shape; and facing the second surface of the holding member upwardly when a second condiment container to be engaged with the condiment holder is of a second exterior shape which is different from the first exterior shape.

In one embodiment, the method may further comprise inserting, when the first surface of the holding member faces upwardly, at least a portion of the first condiment container through an aperture defined in the holding member, wherein the aperture extends between the first surface and the second surface of the holding member; and retaining the first condiment container in place with a pair of opposed wall sections of an interior wall of the holding member which bounds and defines the aperture. In one embodiment, the method may further comprise providing a plurality of first condiment containers each having a different configuration; selecting one of the plurality of first condiment containers for engagement with the holding member; and selecting a different pair of opposed wall sections on the interior wall from a plurality of opposed wall sections on the interior wall for engagement of the selected one of the plurality of first condiment containers.

In one embodiment the method may further comprise inserting, when the second surface of the holding member faces upwardly, the second condiment container into a compartment bounded and defined by at least one retaining wall extending outwardly from the second surface. In one embodiment, orienting the holding member may further comprise rotating the holding member of the condiment holder relative to a connector of the condiment holder and about a longitudinal axis extending between a front wall and a rear wall of the holding member. In one embodiment, the method may further comprise providing the support surface in a form of a fin of a vehicle air vent; and frictionally retaining the connector to the fin via a plurality of flexible teeth. In one embodiment, the method may further comprise retaining the holding member generally horizontally in space regardless of an orientation of the vent fin with which the connector is engaged.

BRIEF DESCRIPTION OF THE DRAWINGS

Sample embodiments of the present disclosure are set forth in the following description, are shown in the drawings and are particularly and distinctly pointed out and set forth in the appended claims.

FIG. 12B is a bottom, front, right side, isometric perspective view of the condiment holder of FIG. 12*a* shown with the second condiment container operatively engaged with a second surface of the condiment holder.

Similar numbers refer to similar parts throughout the drawings.

DETAILED DESCRIPTION

Figure 1:
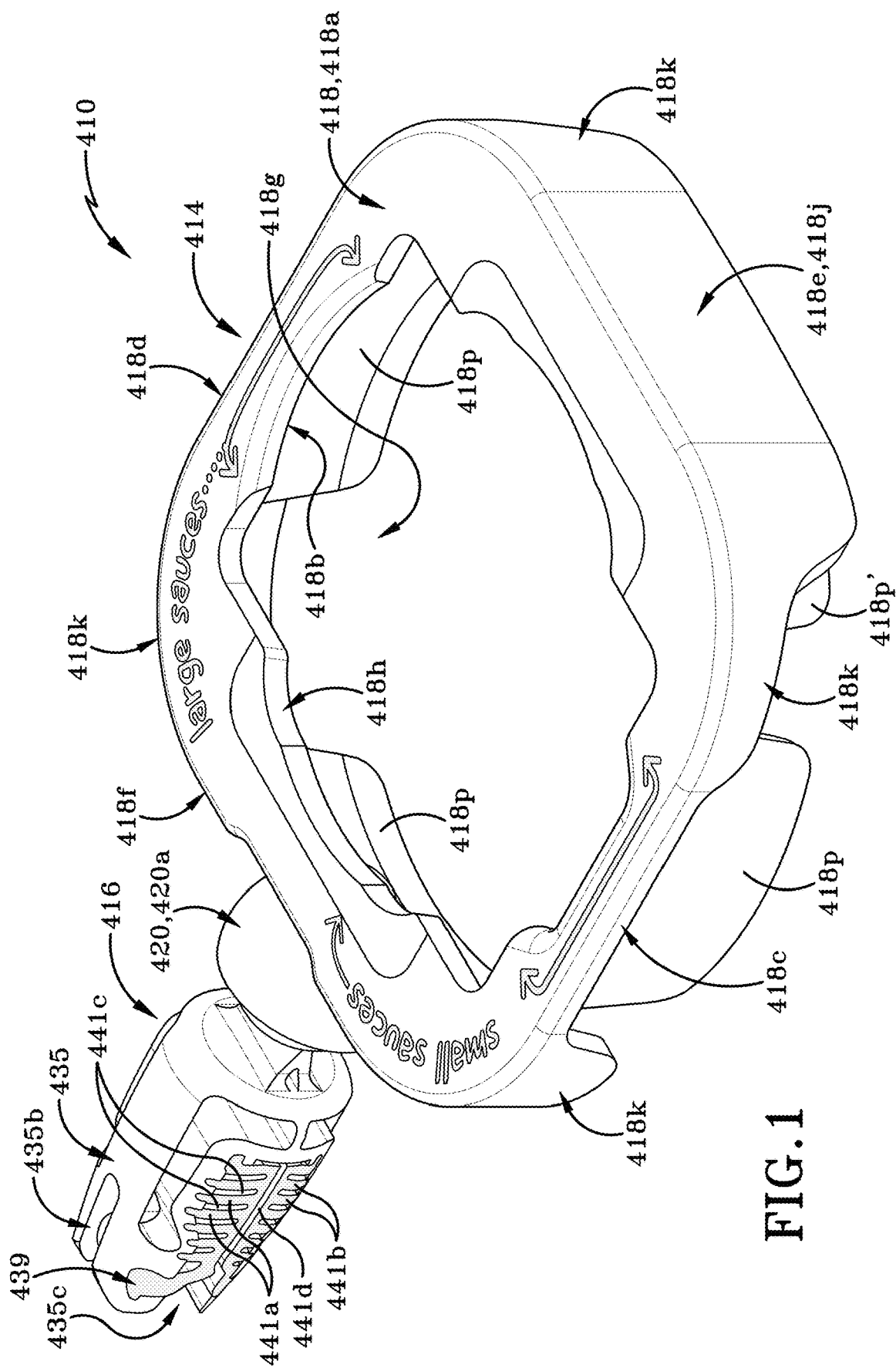
FIG. 1 is a top, front, left side, isometric perspective view of a condiment holder in accordance with the present disclosure.

Referring to FIGS. 1-10B, a condiment holder in accordance with the present disclosure is generally indicated by the reference number 410. Condiment holder 410 is interchangeably referred to herein by the terms "condiment holder 410" or "holder 410".

Holder 410 comprises a holding member and a connector (or securement member). In this description, the holding member will be indicated as "body 414" and the connector will include a "clip 416" and a ball and socket joint (described later herein). Body 414 comprises a base 418 and a neck 420, where neck 420 extends rearwardly outwardly from base 418. Base 418 and neck 420 are molded from any suitable plastic material as a single, monolithic, unitary component. (In other instances, base 418 and neck 420 are separately formed and are secured together by any suitable means such as by heat welding.)

The dimensions of body 414 are therefore generally around 2¾ inches long by 2¾ inches wide. It should be noted that body 414 is not of a size sufficient to permit condiment holder 410 to rest on an upper rim of a vehicle cup-holder. In order for condiment holder 410 to be of a sufficient size to be supported by the upper rim of a vehicle cup-holder, the condiment holder 410 would have to be fabricated in a larger size. In particular, the condiment holder 410 would have to be between 3.5 inches and 4.5 inches in diameter or from at least 3.5 by 3.5 inches long and wide up to about 4.5 by 4.5 inches long and wide. As indicated above, condiment holder 410 is not this larger size but is, instead, smaller than the size required to be supported by on a rim of a cup-holder. If condiment holder 410 were placed onto a cup-holder rim, holder 410 would simply drop into the interior of the cup-holder. Clip 416 extends outwardly from body 414 and therefore increases the overall length of condiment holder 410. Resting clip 416 on a first part of a rim of a cup-holder and resting the body 414 on a second part of the rim of a cup-holder might enable condiment holder 410 to be used with the cup-holder. However, utilizing condiment holder 410 in this manner may not provide the most stable way of supporting a condiment container and is not contemplated as the manner of use of condiment holder 410. The preferred manner of using condiment holder 410 will be described later herein.

Figure 7:
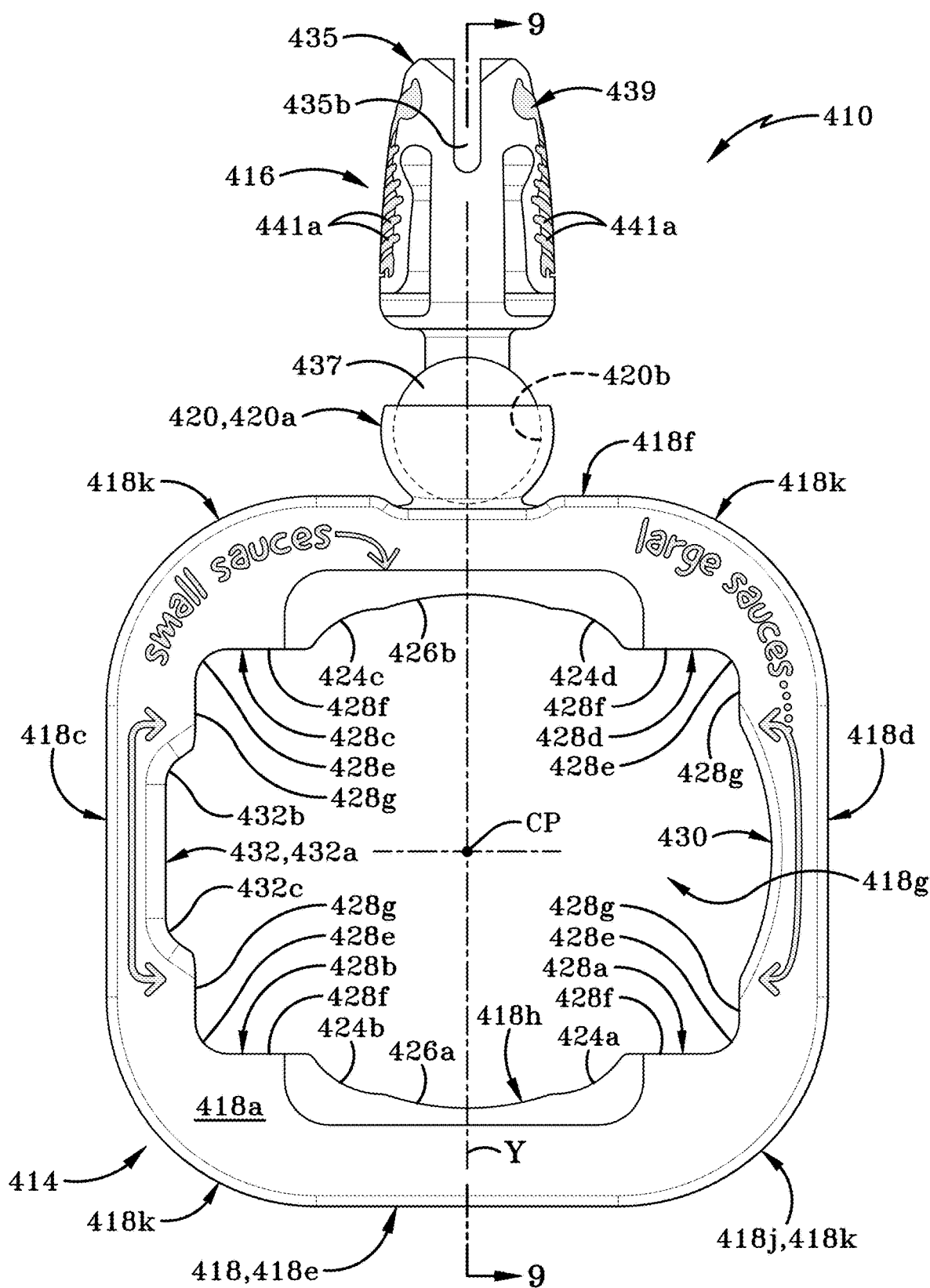
FIG. 7 is a top plan view of the condiment holder.
Figure 8:
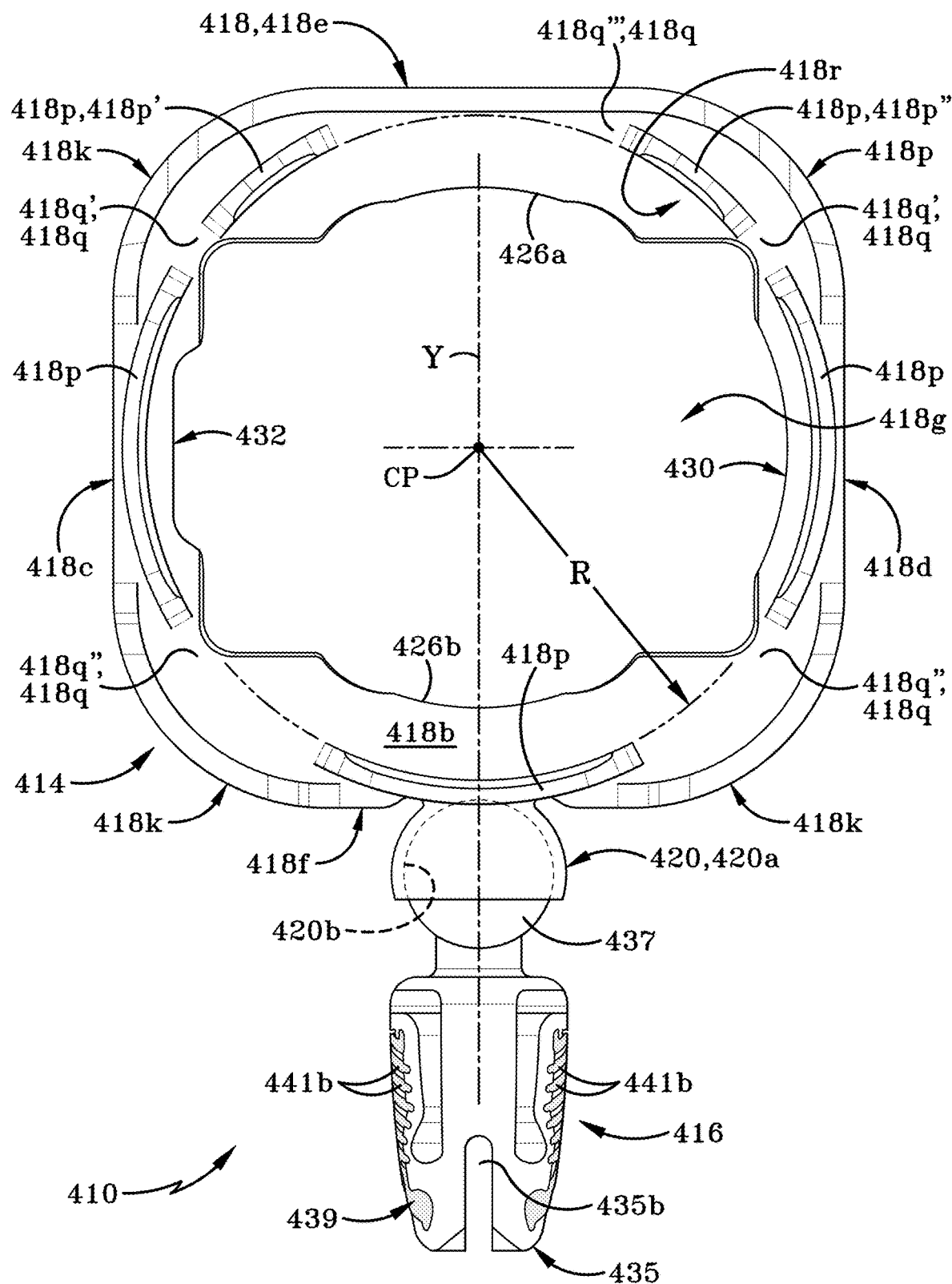
FIG. 8 is a bottom plan view of the condiment holder.

Base 418 of body 414 is generally square in shape when viewed from above (FIG. 7) and includes a wall having a first surface 418*a* and an opposed second surface 418*b* (FIG. 8). First surface 418*a* and second surface 418*b* define a vertical direction therebetween. Base 418 further comprises a left side wall 418*c* and an opposed right side wall 418*d* which define a lateral or transverse direction therebetween. Base 418 further comprises a front wall 418*e* and an opposed rear wall 418*f* which define a longitudinal direction therebetween. A longitudinal axis "Y" (FIGS. 2, 7 & 8) extends between front wall 418*e* and rear wall 418*f*, passing through an imaginary center point "CP" of condiment holder 410. As will be discussed later herein, body 414 is rotatable about longitudinal axis "Y" in either of a first direction or a second direction, as indicated by the arrow "A" in FIG. 2.

A plurality of indicia (not numbered) are provided on first surface 418*a* to indicate to a user where and how to engage a plurality of differently-configured condiment containers with condiment holder 410, and most specifically with first surface 418*a* of condiment holder 410.

An aperture 418*g* is bounded and defined by an interior wall 418*h* of base 418. Aperture 418*g* is generally centrally located in base 418 and extends from first surface 418*a* through to second surface 418*b*. While base 418 is square in overall configuration aperture 418*g* is not generally square but is, instead, generally rectangular in shape. The generally rectangular configuration of aperture 418*g* bounded and defined by interior wall 418 is configured to include various differently shaped and curved regions which are arranged in opposed pairs. Each pair of differently shaped and curved regions is configured to retain a differently-configured condiment container or receptacle therebetween, as will be later described herein. Aperture 418*g* is configured to receive at least a portion of any one of a plurality of differently-shaped condiment containers or receptacles therein. In particular, aperture 418*g* is configured to selectively receive a portion of one of at least three differently-configured or differently-shaped condiment containers therein. Specifically, interior wall 418*h* and therefore aperture 418*g* is configured such that a portion of one of at least four differently-shaped condiment containers is able to be selectively and individually operatively engaged within aperture 418*g* of base 418. It will be understood that the ability to operatively engage an individual one of the plurality of differently-configured condiment containers in aperture 418*g* is made possible by the specific shape of the interior wall 418*h* which bounds and defines aperture 418*g*. It will be understood that only one style or shape of condiment container is able to be engaged with holder 410 at any one time. The particulars of the differently-configured or shaped condiment containers will be discussed later herein.

The exterior surfaces of left side wall 418*c*, front wall 418*e*, right side wall 418*d* and rear wall 418*f* form an exterior perimeter wall 418*j* (FIGS. 1&7) of base 418. Perimeter wall 418*j* is located radially outwardly from interior wall 418*h* and includes rounded corners 418*k* wherein front wall 418*e* and rear wall 418*f* meet left side wall 418*c* and right side wall 418*d*. The rounded corners 418k help to ensure that condiment holder 410 does not present any sharp edges that could cause a minor injury to a consumer during use. Front wall 418e is of a greater height along most of its length from proximate left side wall 418c to right side wall 418d than are each of the rear wall 418f, left side wall 418c and right side wall 418e. As such, front wall 418e provides a region on its exterior surface which is suitable for an advertising logo to be placed on condiment holder 410. It will be understood that the configuration and relative heights of left side wall 418c, right side wall 418d, front wall 418e, and rear wall 418f may be varied to be different in appearance from the configuration shown in the attached figures.

As indicated earlier, interior wall 418h is shaped so as to form a plurality of different sets of wall sections. Opposed wall sections are selectively configured to engage areas of variously shaped condiment containers, such as those provided by major fast-food restaurant chains. It should be noted that interior wall 418h is not configured to substantially conform to the exterior shape of any of the variously shaped condiment containers. Instead, each of the various sets of opposed wall sections discussed hereafter are designed to only contact discrete areas of the exterior shape of one of the plurality of variously shaped condiment containers provided by fast-food chains. This arrangement ensures that more than only one or two shapes of condiment container are able to be operatively engaged with condiment holder 410.

The specific details of the various wall sections which form interior wall 418h have been described in detail in U.S. Pat. No. 10,967,776 entitled "Condiment Holder" issued on Apr. 6, 2021, and in U.S. Publication No. 2021/0178951 entitled "Rotatable Condiment Holder", published Jun. 17, 2021. The entire disclosures of these two publications are incorporated herein by reference. Inasmuch as the details of the interior wall 418h have been fully described in these two publications, the interior wall 418h and its manner of use will not be described in any further detail herein other than to identify that interior wall 418h defines first wall sections, second wall sections, third wall sections, a fourth wall section, and a fifth wall section.

Referring to FIG. 7, interior wall 418h comprises a set of first wall sections 424a, 424b, 424c, and 424d. First wall sections 424a, 424b are located proximate front wall 418e of base 418 and first wall sections 424c, 424d are located proximate rear wall 418f of base 418. First wall sections 424a, 424b are spaced laterally apart from one another and first wall sections 424c, 424d are spaced laterally apart from one another. First wall section 424a is located longitudinally a distance away from and opposite first wall section 424d. First wall section 424b is located longitudinally a distance away from and opposed to first wall section 424c. Each of the first wall sections 424a, 424b, 424c, and 424d is a concavely-curved length of interior wall 418h.

Interior wall 418h further comprises a set of second wall sections 426a, 426b. Second wall section 426a is spaced a distance longitudinally from second wall section 426b and is opposed to second wall section 426b. Second wall section 426a is located between first wall section 424a and first wall section 424b. Second wall section 426b is located between first wall section 424c and first wall section 424d. Second wall sections 426a, 426b have a radius of curvature that differs from a radius of curvature of first wall sections 424a-24d.

Interior wall 418h further comprises a set of third wall sections 428a, 428b, 428c, and 428d. First wall section 424a is located between third wall section 428a and second wall section 426a. First wall section 424b is located between third wall section 428b and second wall section 426a. First wall section 424c is located between third wall section 428c and second wall section 426b. First wall section 424d is located between third wall section 428d and second wall section 426b. Each of the third wall sections 428a-28d includes a curved central region 428e and two straight regions 428f and 428g which extend outwardly from the curved central region 428e. The straight regions 428f and 428g are oriented generally at right angles relative to one another. Third wall section 428a is spaced laterally from third wall section 428b and longitudinally from third wall section 428d. Third wall section 428b is spaced laterally from third wall section 428a and longitudinally from third wall section 428c. Third wall section 428c and third wall section 428d are spaced laterally from each other. Third wall section 428a is opposed to third wall section 428d and third wall section 428b is opposed to third wall section 428c.

Interior wall 418h also includes a fourth wall section 430 located between third wall section 428a and third wall section 428d. In particular, the curved fourth wall section 430 is located between the straight regions 428g of third wall section 428a and third wall section 428d. A fifth wall section 432 is opposed to and laterally spaced from fourth wall section 430. Fifth wall section 432 includes a straight region 432a, a first curved region 432b, and a second curved region 432c. First curved region 432b and second curved region 432c are located on opposite ends of straight region 432a. First curved region 432b is located between straight region 428g of third wall section 428c and straight region 432a of fifth wall section 432. Second curved region 432c is located between straight region 428g of third wall section 428b and straight region 432a of fifth wall section 432.

Figure 11:
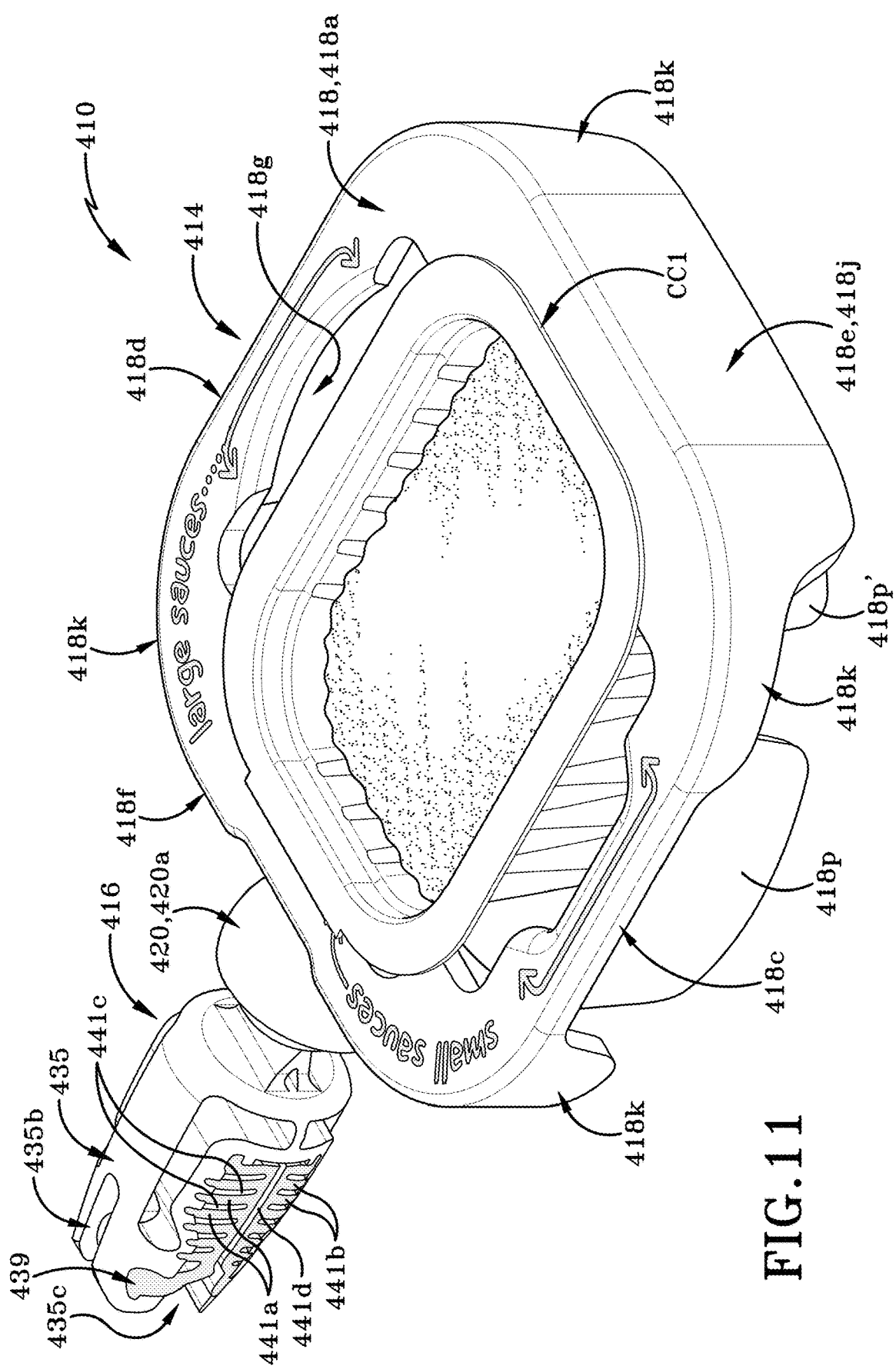
FIG. 11 is a top, front, left side, isometric perspective view of the condiment holder of FIG. 1 shown with a first condiment container operatively engaged with a first surface of the condiment holder.

The specific dimensions of the first, second, third, fourth, and fifth wall sections have been disclosed in U.S. Pat. No. 10,967,776 and in U.S. Publication No. 2021/0178951 identified earlier herein. Additionally, the manner of using the various wall sections to support at least four differently-configured condiment containers or receptacles has been described in detail therein and will not be further described herein. By way of example only, FIG. 11 shows one of a plurality of condiment containers, indicated as "CC1" engaged within the aperture 418g and supported by the first wall sections 424a, 424b, 424c, and 424d of base 418. In particular, the condiment container "CC1" will be press-fitted into the aperture 418g and be engaged by the first wall sections 424a, 424b, 424c, and 424d and retained therein by friction. A differently-configured condiment container (shown in one of the prior-referenced publications) may be received at least partially within aperture 418g and supported by second wall sections 426a, 426b. A further differently-configured condiment container (shown in one of the prior-referenced publications) may be at least partially received through aperture 418g and be supported by third wall sections 428a, 428b, 428c, and 428d (and therefore by wall sections 428e, 428f, and 428g thereof). A still further differently-configured condiment container (shown in one of the prior-referenced publications) may be at least partially received through aperture 418g and be supported by fourth and fifth wall sections 430, 432. As mentioned earlier herein, only one of these differently-configured condiment containers is able to be operatively engaged with the condiment holder 410 at any one time. In each instance, the differently-configured condiment container may be press-fitted into the aperture 418g and be engaged and frictionally retained in condiment holder 410 by the appropriate set of wall sections.

Figure 2:
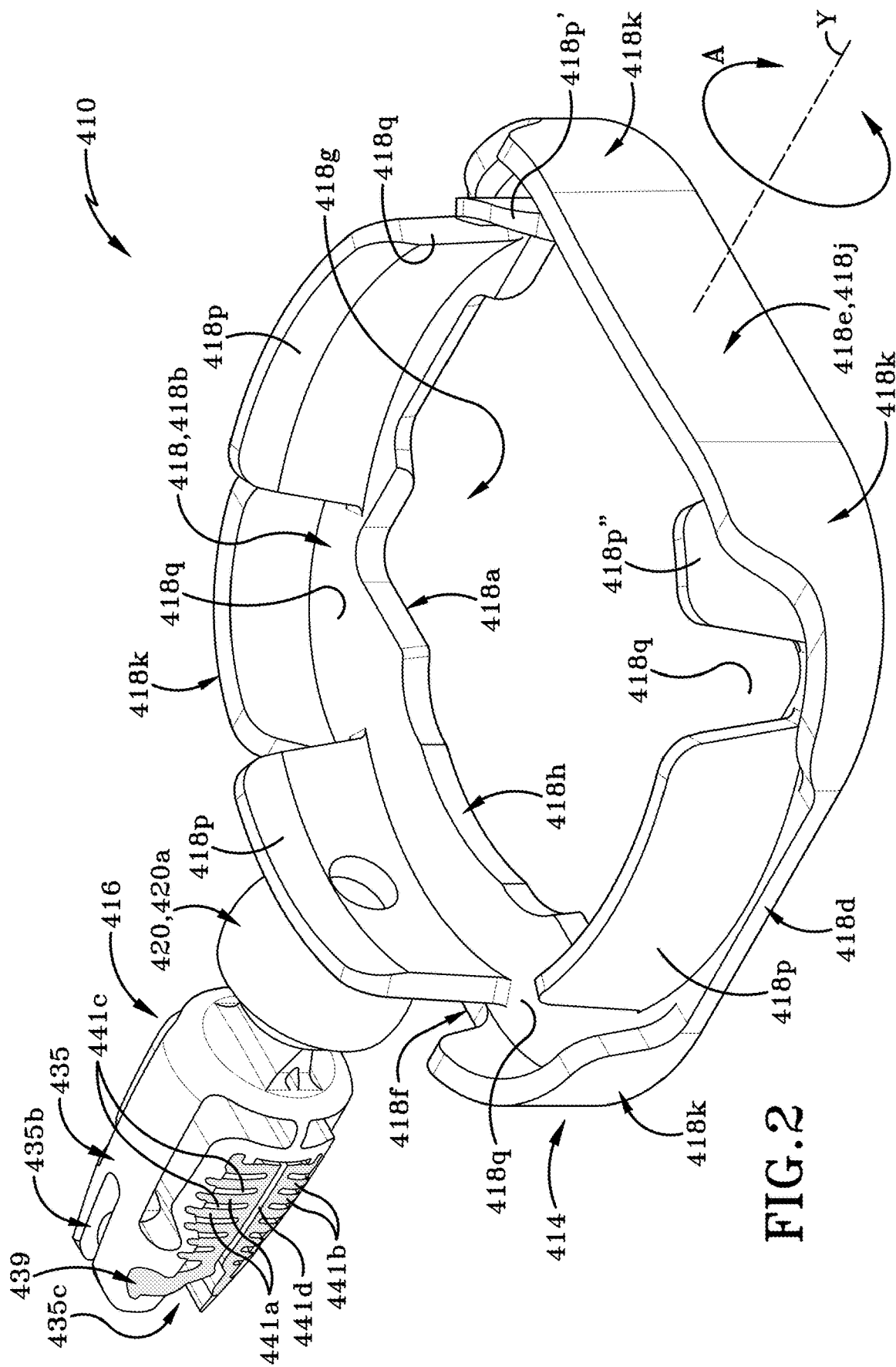
FIG. 2 is a bottom, front, right side, isometric perspective view of the condiment holder of FIG. 1.
Figure 3:
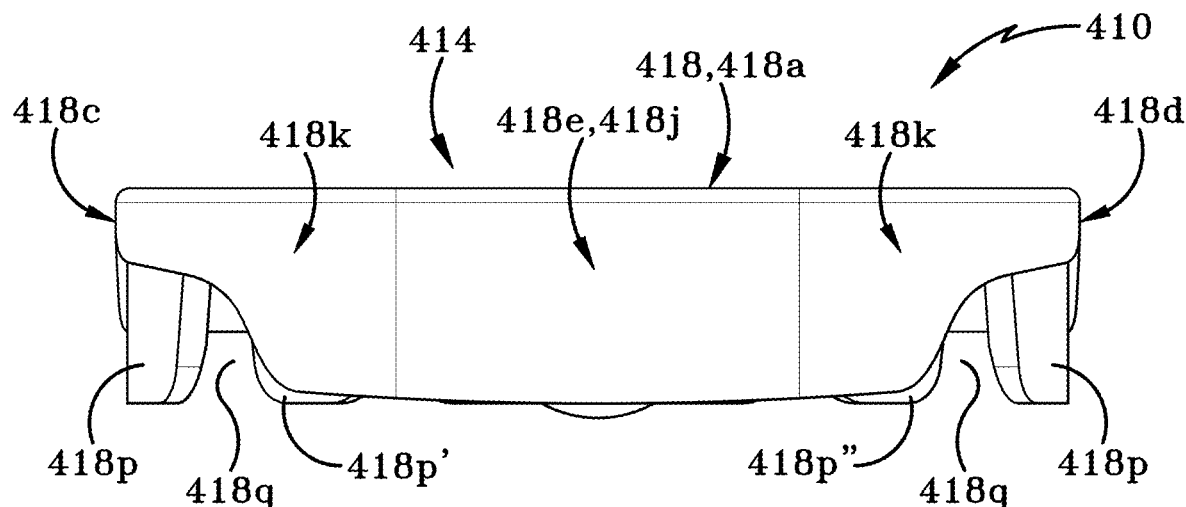
FIG. 3 is a front elevation view of the condiment holder.
Figure 4:
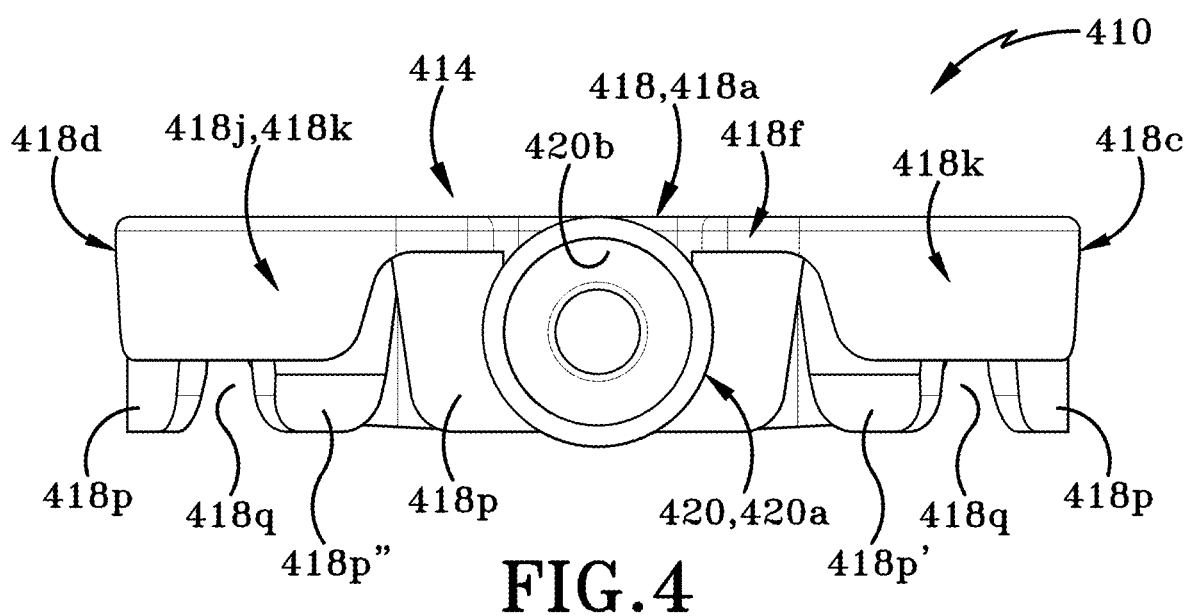
FIG. 4 is a rear elevation view of the holding member of the condiment holder.

Referring now to FIGS. 2 and 8, the second surface 418*b* of base 418 is shown in greater detail. During use, the consumer will select to orient condiment holder 410 so that one or the other of the first surface 418*a* and the second surface 418*b* faces upwardly for use, i.e., facing towards a ceiling of the vehicle. As is evident from FIGS. 2 and 8, when second surface 418*b* faces upwardly toward a ceiling of the vehicle, the various sets of wall sections which form the interior wall 418*h* of base 418 are available for use to support a condiment container, such as "CC1" should the user choose to utilize this second surface 418*b* for this purpose. However, in accordance with a specific aspect of the present disclosure, second surface 418*b* may be utilized to support a condiment container that is different from the condiment container "CC1", where "CC1" represents any of the differently-configured condiment containers which may be operatively engaged at least partially within aperture 418*g* and be supported by one of the pairs of wall sections as described above. The differently-configured containment container, referred to herein as "CC2" is not able to be received at least partially through aperture 418*g* or be supported by one of the pairs of wall sections which comprise interior wall 418*h*.

Second surface 418*b* of base 418 is provided with a structure for operatively engaging second condiment container "CC2" with base 418. The structure comprises one of more retaining walls 418*p* extend outwardly from second surface 418*b*. As illustrated in these accompanying figures, five retaining walls 418*p* extend outwardly from second surface 418*b*. Each retaining wall 418*p* is arcuate in configuration. As best seen in FIG. 8, the concavely-curved retaining walls 418*p* are arranged to form part of a circumference of an imaginary circle which at least partially or fully circumscribes imaginary center point "CP" of base 418. As such, a radius of curvature of all retaining walls 418*p* is the same. In one embodiment, the radius "R" (FIG. 8) of the imaginary circle is about 1.25 inches.

Each retaining wall 418*p* extends outwardly away from second surface 418*b* in a direction moving away from first surface 418*a*. Furthermore, each retaining wall 418*p* tapers in length moving away from second surface 418*b* towards a free end of that particular retaining wall 418*p*. The length of the two retaining walls 418*p* proximate left side wall 418*c* and right side wall 418*d* may be approximately 1.2 inches. The length of the retaining wall 418*p* proximate rear wall 418*f* is approximately 1.09 inches. The length of retaining walls 418*p'* and 418*p"* is approximately 0.5 inches.

In one embodiment, each retaining wall 418*p* is oriented generally at 90° to second surface 418*b* although retaining walls 418*p* may be arranged so that their free ends, remote from second surface 418*b*, angle slightly inwardly toward one another. Retaining walls 418*p* are located radially outwardly from interior wall 418*h*. In particular, retaining walls 418*p* are each located a distance radially outwardly from interior wall 418*h* such that an area of second surface 418*b* is located between interior wall 418*h* and an interior surface of the associated retaining wall 418*p*. (The interior surface of each retaining wall 418*p* is that surface which is closest to and faces inwardly towards aperture 418*g*.)

The length of at least some of the five retaining walls 418*p* differs from the length of the rest of the retaining walls 418*p*. In particular, the lengths of the retaining walls 418*p* which are adjacent left side wall 418*c*, right side wall 418*d*, and rear wall 418*f* is substantially the same. Two retaining walls 418*p* are located proximate the corners 418*k* where front wall 418*e* joins left side wall 418*c* and right side wall 418*d*. The two retaining walls 418*p'* and 418*p"* (FIG. 8) are shorter in length than the other three retaining walls 418*p*.

Adjacent retaining walls 418*p* are separated from one another by a gap 418*q*. FIG. 8 shows the gap 418*q'* between each of the retaining walls 418*p'* or 418*p"* and the adjacent retaining wall 418*p* is smaller in length than the gap 418*q"* between adjacent retaining walls 418*p*. Additionally, the gap 418*q'"* between retaining walls 418*p'* and 418*p"* is greater in length than either of the gaps 418*q'* or 418*q"*. The plurality of retaining walls 418*p*, 418*p'*, 418*p"* and gaps 418*q*, 418*q'* and 418*q"* bound and define a compartment 418*r* (FIG. 12A) into which second condiment container "CC2" of a different configuration is able to be inserted.

It will be understood that while five retaining walls 418*p* are illustrated in the attached figures, in other embodiments a single, unbroken circular retaining wall may extend outwardly from second surface 418*b*. In yet other embodiments, a pair of semi-circular retaining walls which are separated from one another by two gaps may extend outwardly from second surface 418*b*. In yet other embodiments, three, four, or more than five curved retaining walls may extend outwardly from second surface 418*b* and be separated from one another by gaps. It will further be understood that the lengths of the retaining walls in these other embodiments may be different from what is illustrated in the attached figures and the lengths of the gaps between adjacent retaining walls may be different from the lengths of the gaps shown in the attached figures. For example, six retaining walls of the same length as one another may form a circular retaining structure extending outwardly from second surface 418*b* and these six retaining walls may be separated from one another by gaps of equal length to one other. In other words, any manner of forming the retaining structure which extends outwardly from second surface may be utilized.

It will further be understood that while the retaining walls 418*p* in the attached figures are illustrated as being arranged to form part of the circumference of an imaginary circle, in other embodiments, the retaining walls may be arranged to form a shape other than a circle. For example, a retaining structure shaped as a square or rectangle or any other shape which defines a portion of an exterior surface of a condiment container may be provided. The other shaped retaining structure is suitable for engaging a condiment container which cannot be received through the aperture 418*g* and be engaged with wall sections of interior wall 418*h* which defines aperture 418*g*.

Referring particularly to FIGS. 2, 5, 6, 7, and 9, neck 420 which extends outwardly from base 418 will be discussed in further detail. Neck 420 is integrally formed with and extends outwardly from one of the retaining walls 418*p*. In particular, neck 420 extends outwardly and rearwardly from the retaining wall 418*p* which is adjacent rear wall 418*f*. This particular retaining wall will be referred to hereafter as "rear retaining wall 418*p*". Neck 420 comprises a hemispherical wall 420*a* which joins rear retaining wall 418*p* at a pole region of the hemisphere in such a way that a socket 420*b* (FIGS. 4, 9, and 10B) is defined in neck 420.

As indicated earlier herein, condiment holder 410 includes a connector comprising a clip 416 that is engaged with body 414. In particular, clip 416 is engaged with body 414 via the socket 420*b* defined by neck 420.

Figure 9:
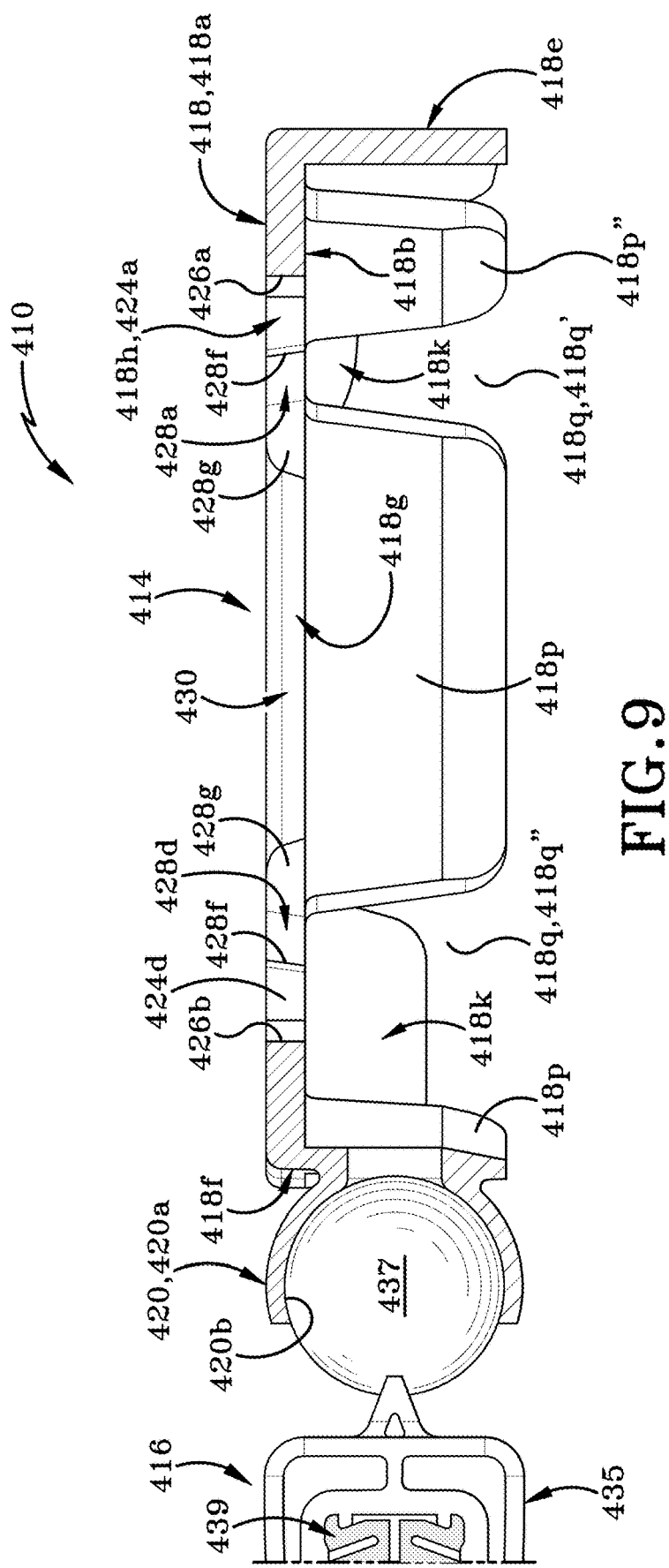
FIG. 9 is a longitudinal cross-section of the condiment holder taken along line 9-9 of FIG. 7.
Figure 10:
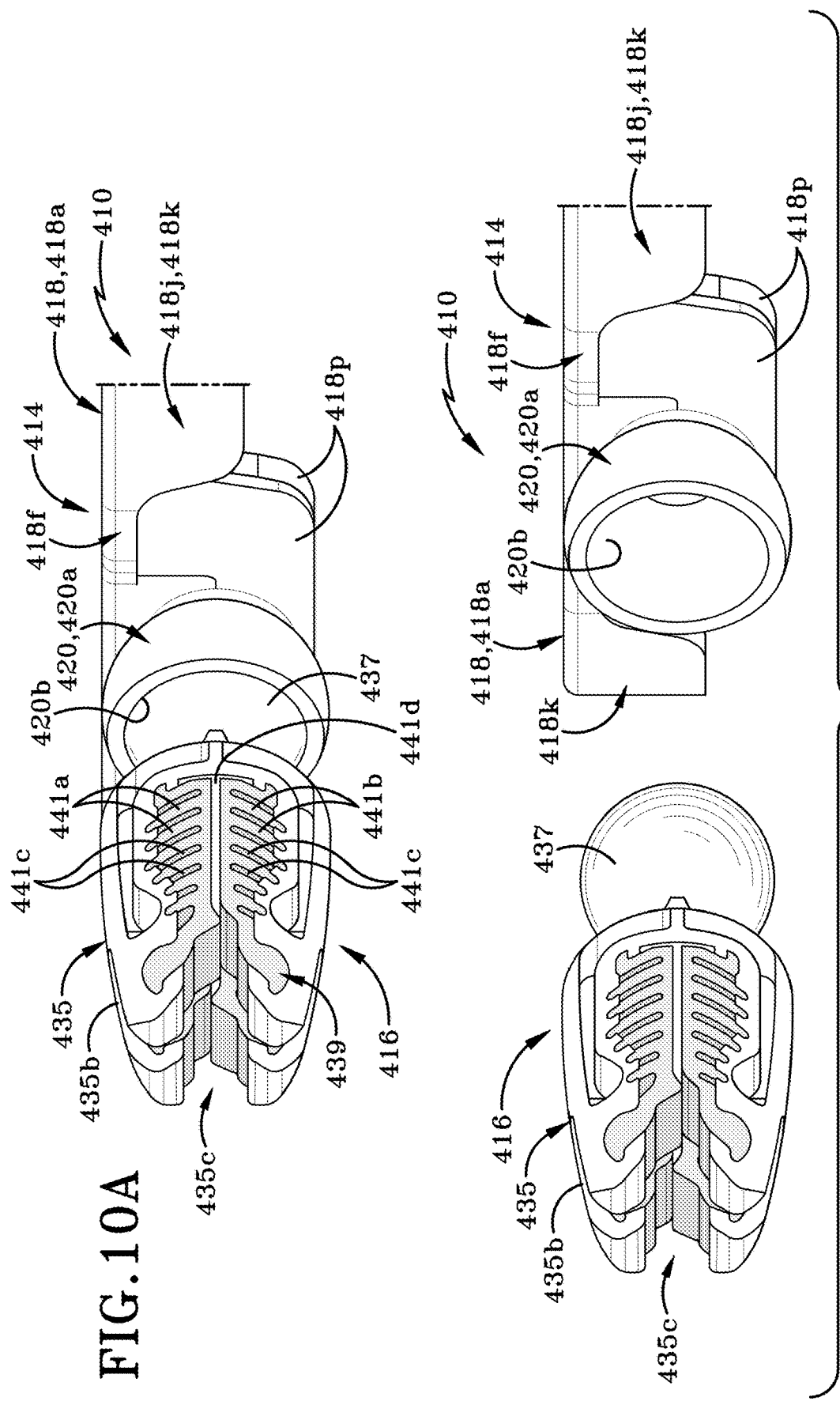
FIG. 10A is a partial rear, left side isometric perspective view of the condiment holder showing the clip engaged with the body of the condiment holder.
FIG. 10B is a partial rear, left side isometric perspective view of the condiment holder showing the clip exploded outwardly away from the body of the condiment holder.

Referring particularly to FIGS. 9, 10A, and 10B, clip 416 is shown to include a housing 435. A ball 437 of the ball joint extends outwardly from a first end of housing 435. Housing 435 and ball 437 are formed from any suitable substantially rigid plastic material as a single, monolithic, unitary component. Ball 437 is configured to be received within socket 420*b* defined by neck 420 of base 418. Together ball 437 and socket 420*b* form a ball and socket joint or ball joint which enables the body 414 and clip 416 to rotate relative to one another. In particular, the ball joint enables body 414 and clip 416 to be rotated relative to one another in order to set the two components at a variety of desired angles and arrangements relative to one another. The rigid housing 435 defines a hollow interior region 435*a* (FIG. 5A) into which at least one insert 439 of a flexible material is installed. The flexible material may be an elastomeric material. In one embodiment, the flexible material may be rubber. A second end of housing 435 defines a first entry recess 435*b* and a second entry recess 435*c* which are in fluid communication with the interior region 435*a*. Insert 439 may be accessed through second entry recess 435*c* as will be later described herein.

Figure 5:
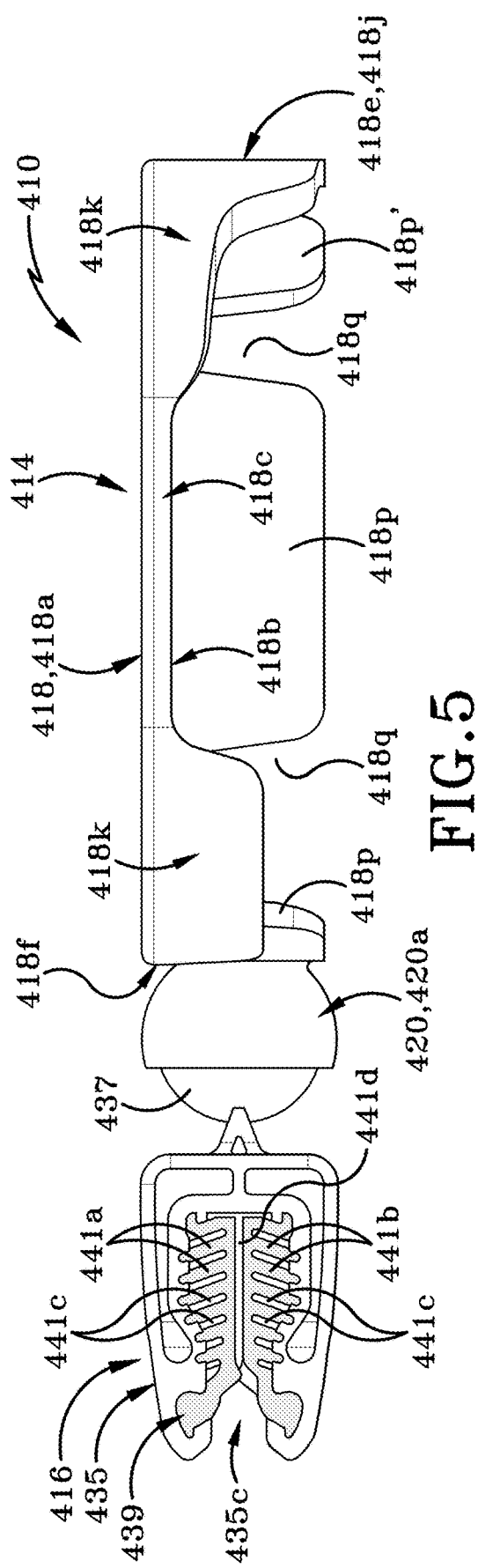
FIG. 5 is a left side elevation view of the condiment holder.
Figure 5A:
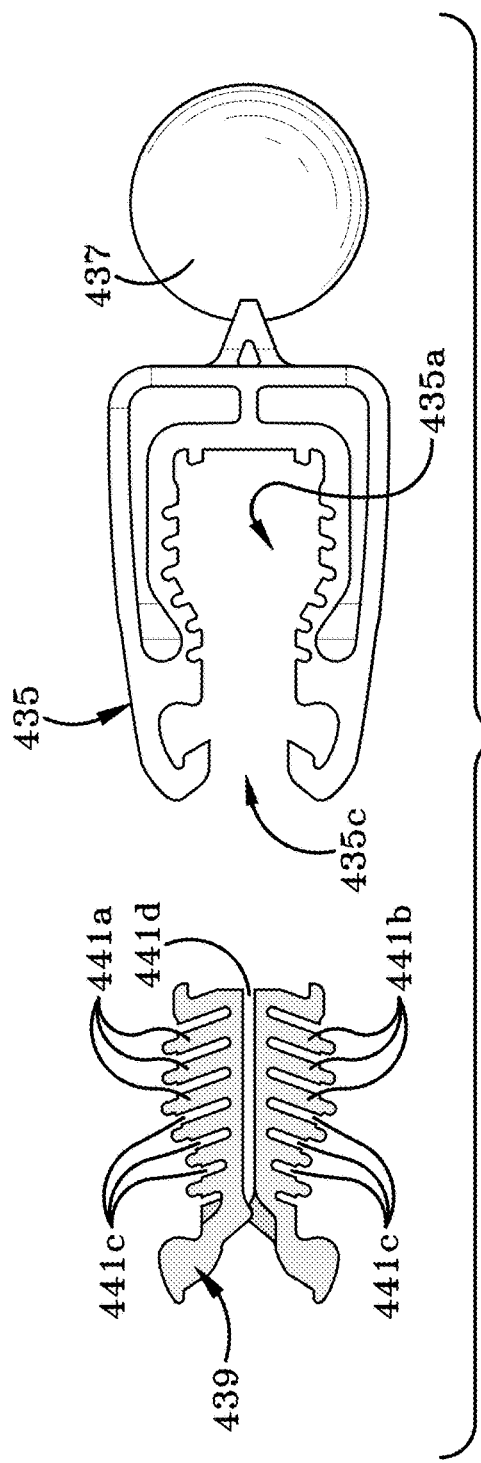
FIG. 5A is an exploded left side elevation view of the clip of the condiment holder shown in isolation.
Figure 6:
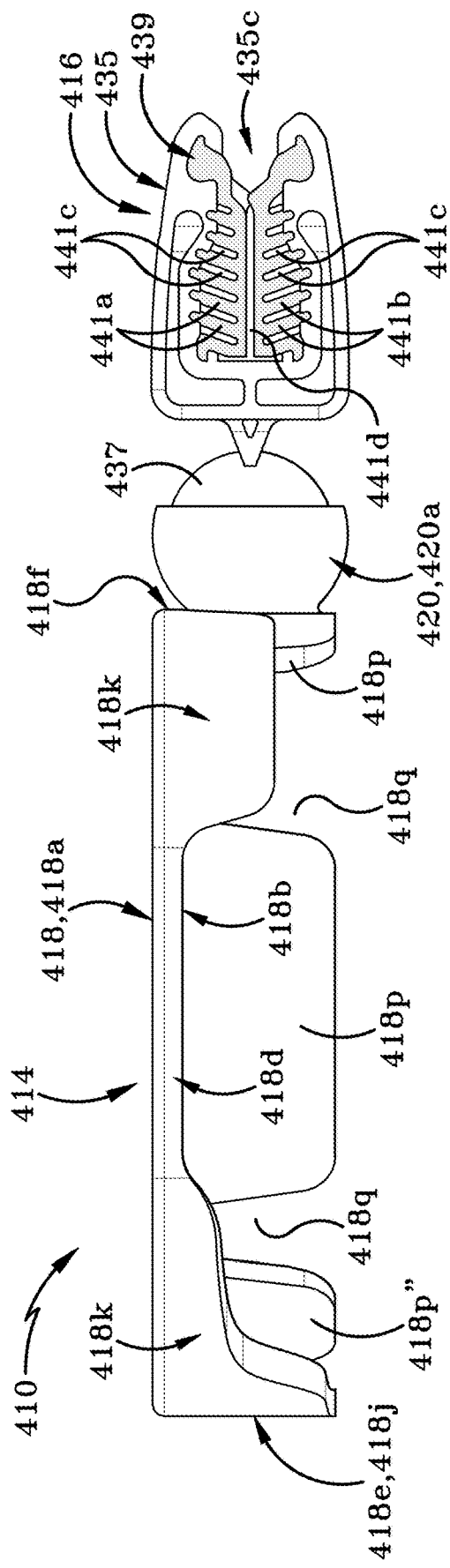
FIG. 6 is a right side elevation view of the condiment holder.

The insert 439 comprises two separate rows of flexible teeth 441*a*, 441*b* which are arranged in a pattern similar to the bones of a fish skeleton (FIG. 5A). Adjacent teeth in the two rows of teeth 441*a*, 441*b* are separated from one another by a slot 441*c* such that the insert 439 comprises alternating teeth and slots. The slots 441*c* allow the teeth 441*a*, 441*b* to flex relative to one another. The terminal end of each tooth 441*a*, 441*b* is received within a dedicated groove (not numbered) defined in the interior surface of housing 435 which bounds and defines the interior region 435*a* thereof. The opposite end of each of teeth 441*a*, 441*b* is integrally formed with a backbone region of the insert 439. The teeth 441*a*, 441*b* extend outwardly from the backbone region towards the interior surface of housing 435 and are received into the dedicated grooves. An elongated, relatively narrow slit 441*d* extends along a centerline of the backbone region, thereby separating the first row of teeth 441*a* from the second row of teeth 441*b*. The purpose of the slit 441*d* and flexible teeth 441*a*, 441*b* will be discussed further later herein.

When a user wishes to utilize condiment holder 410 to support any one of a variety of differently-configured condiment container, the user will determine which of the first surface 418*a* and second surface 418*b* to position to face upwardly to receive the particular condiment container. The selection of the first surface 418*a* or the second surface 418*b* is based on whether the user thinks the particular condiment container will fit at least partially through the aperture 418*g* defined in first surface 418*a* or needs to rest upon second surface 418*b* and be retained in place by retaining walls 418*p*.

The user is able to quickly and easily rotate body 414 of condiment holder 410 about longitudinal axis "Y" between a first position where first surface 418*a* faces upwardly (as in FIG. 1) and a second position where second surface 418*b* faces upwardly (as in FIG. 2). The rotation of body 414 is accomplished simply by grasping base 418 between the user's index rib and thumb of one hand and grasping clip 416 between the index rib and thumb of the other hand, and then rotating base 418 and clip 416 relative to one another about longitudinal axis "Y" (FIG. 2).

The holding member 414 of condiment holder 410 is engaged with a support surface via the clip 416. One type of support surface with which the clip 416 may be engaged is a fin "F" (FIG. 13A) of a vehicle air vent as will be described later herein. This engagement with the fin "F" may occur before the body 414 has been moved to the first position (FIG. 1) or the second position (FIG. 2) or after the body 414 has been moved to the desired first position or second position. When condiment holder 410 is in the desired first position or second position, the user will engage the particular condiment container "CC1" or "CC2" with condiment holder 410.

Figure 12A:
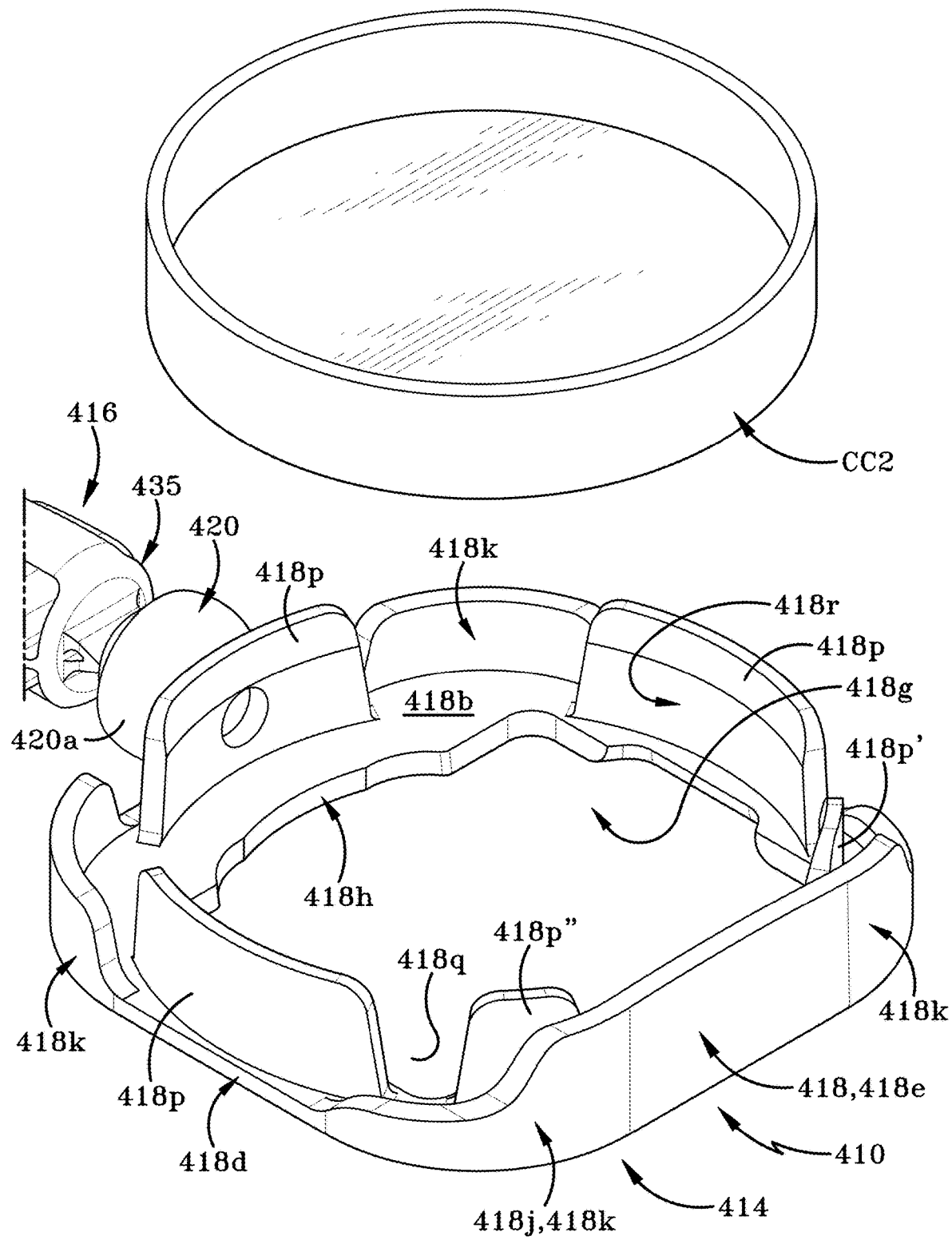
FIG. 12A is a partial bottom, front, right side, isometric perspective view of the condiment holder of FIG. 1 shown with a second condiment container exploded outwardly therefrom.

FIG. 11 shows condiment holder 410 with first surface 418*a* facing upwardly and an exemplary condiment container "CC1" engaged with condiment holder 410. FIGS. 12A and 12B show condiment holder 410 with second surface 418*b* facing upwardly and condiment container "CC2" positioned for engagement with condiment holder 410 (FIG. 12A) and engaged with condiment holder 410 in FIG. 12B. The condiment containers "CC1" and "CC2" may be the user's own containers or may be condiment containers provided by a fast food restaurant. In particular, as shown in FIG. 12A, "CC2" may be a circular ramekin specially designed for engagement within the compartment 418*r* bounded and defined by retaining walls 418*p*, 418*p'* and 418*p"*.

When condiment container "CC1" is engaged with first surface 418*a* of condiment holder 410, the user will orient the particular condiment container "CC1" to fit partially through the aperture 418*g* in a suitable manner that will enable the particular condiment container to rest upon one of the sets of wall sections defined by interior wall 418*p*. The engagement of various differently-configured condiment containers "CC1" with previous embodiments of the condiment holder has been described in detail in U.S. Pat. No. 10,967,776 and in U.S. Publication No. 2021/0178951 and therefore will not be discussed further herein.

Condiment container "CC2" is one that may be of a substantially similar diameter to the imaginary circle formed by retaining walls 418*p* extending outwardly from second surface 418*b* of condiment holder 418. In this instance, the condiment container "CC2" will be press-fitted into the circle formed by the retaining walls 418*p* and will be retained therein by friction. In other instances, the condiment container "CC2" may have a slightly smaller diameter than the circle formed by retaining walls 418*p* and may therefore be received within the circumference of that circle but will simply rest upon the areas of second surface 418*b* extending between the interior surfaces of retaining walls 418*b* and aperture 418*g*. If the condiment container has an even smaller diameter, that particular container may be better suited for engagement with the first surface 418*a* of the condiment holder 410. In this latter instance, the user will simply rotate the body 414 to face the first surface 418*a* upwardly and will then insert part of the smaller diameter circular condiment container through aperture 418*a* and engage the rim of the container with the second wall sections 426*a*, 426*b*. (In a similar fashion, if the user was attempting to engage a circular condiment container with first surface 418*a* of condiment holder 410 facing upwardly and the user determines that particular condiment container is too large to fit through aperture 418*g*, the user will then rotate condiment holder 410 so that second surface 418*b* is facing upwardly. The larger diameter condiment holder will then be inserted into the compartment 418*r* circumscribed by the retaining walls 418*p*.

As indicated earlier herein, condiment holder 410 is engaged with a fin "F" of a vehicle air vent using clip 416. In order to engage condiment holder 410 with fin "F", the user will position housing 435 of clip 416 so that fin "F" slides into the second recess 435*c* of housing 435 and into the slit 441*d* defined between the first and second rows 441*a*, 441*b* of flexible teeth. The particular arrangement of the flexible teeth of each of the first and second rows, i.e. angled slightly rearwardly towards the second end of the housing 435 (i.e., away from the ball 437), resists a tendency of the condiment holder 410 to slide back off the fin "F". The resistive tendency of the flexible teeth 441a, 441b is such that if the user wishes to remove the condiment holder 410 from the vent fin "F", the user will have to grip the body 416 and apply some force to disengage the holder 410 from the fin "F".

Figure 13A:
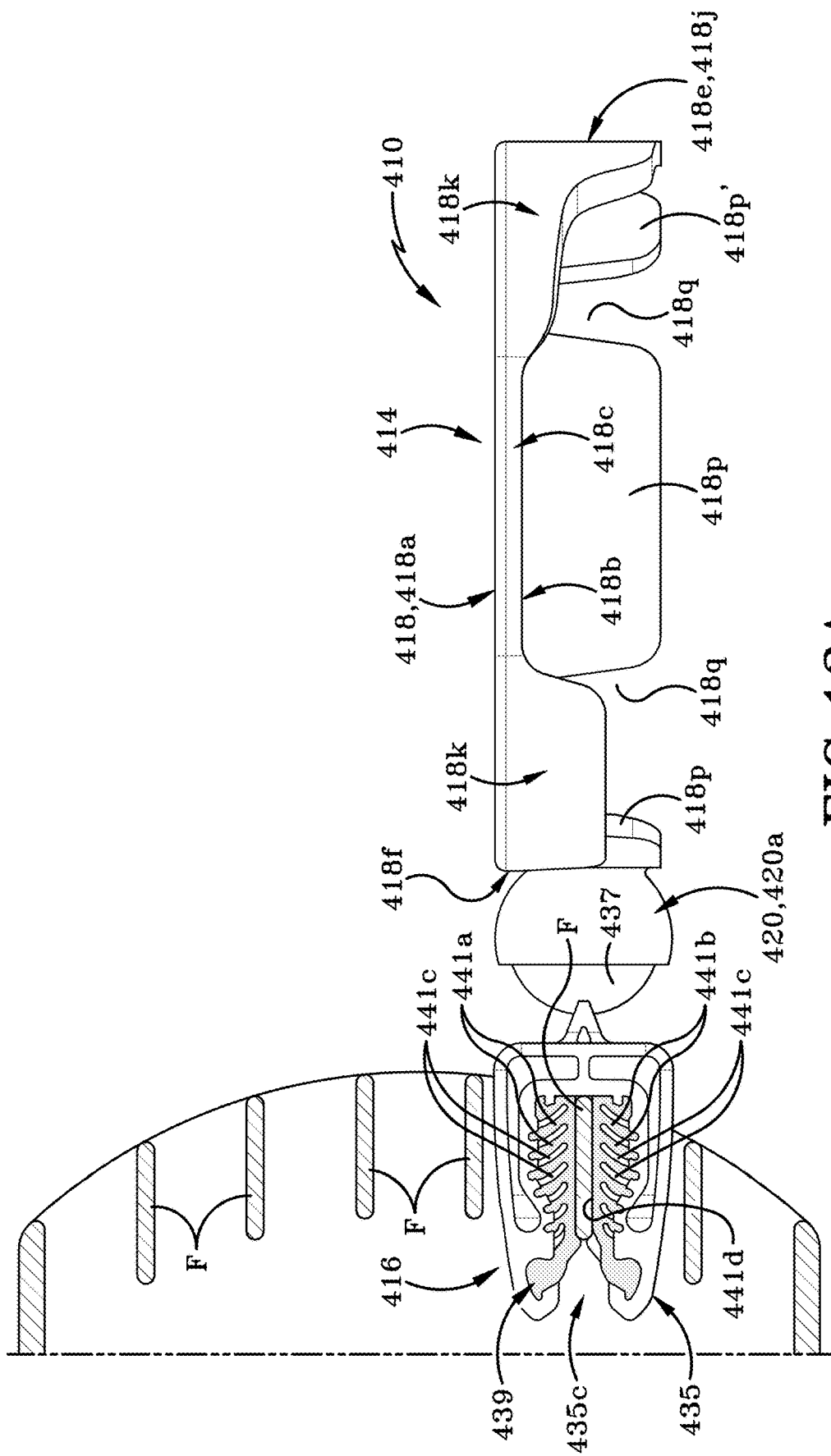
FIG. 13A is a left side elevation view showing the condiment holder operatively engaged with a fin of an air vent of a vehicle, and showing the fin in a first orientation.

FIG. 13A shows clip 416 engaged with one vent fin "F" when that fin is in a horizontal orientation. The figure shows that body 414 of condiment holder 410 is also oriented horizontally and therefore is in an ideal position for use (once a condiment container has been engaged with body 414).

Figure 13B:
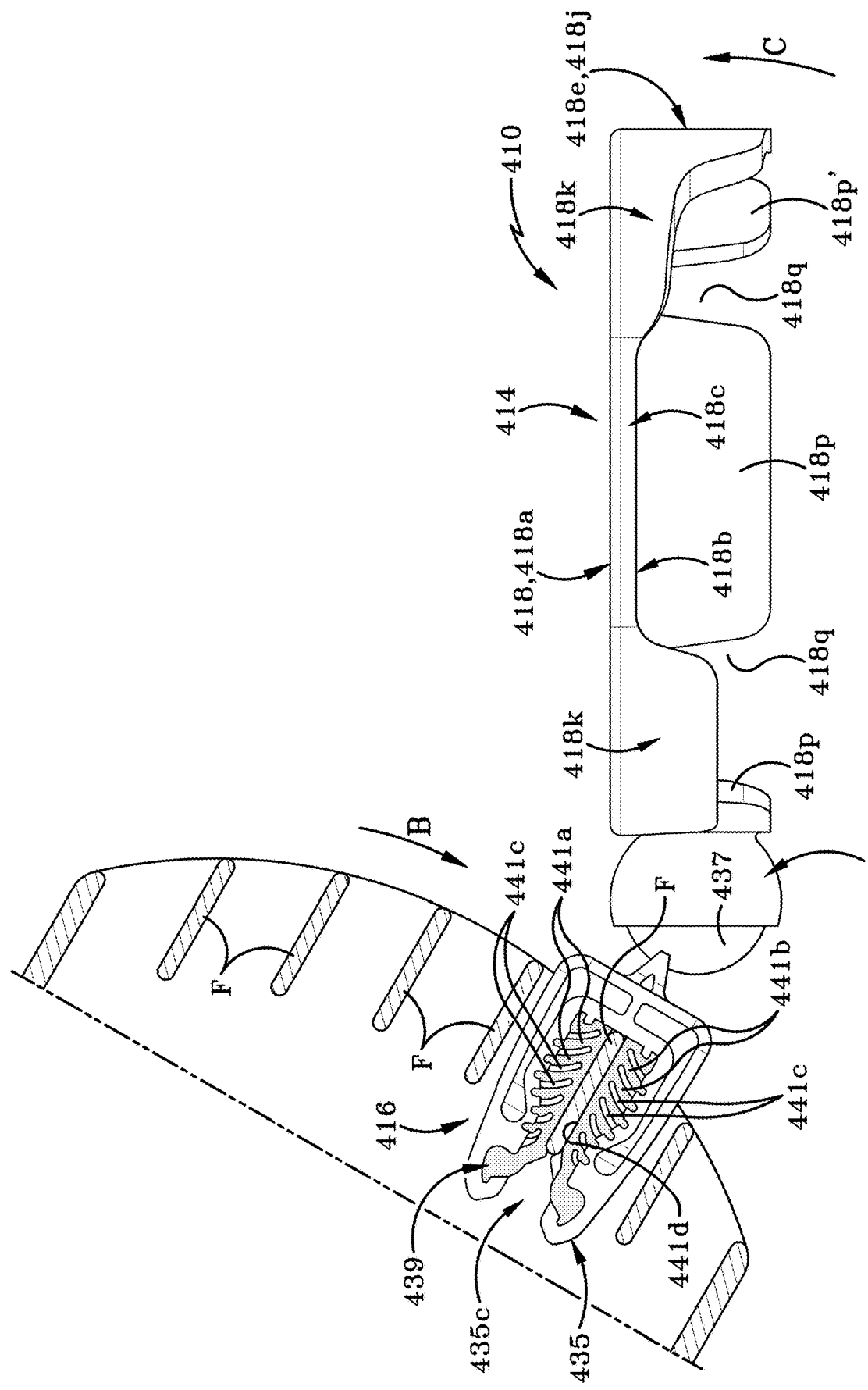
FIG. 13B is a left side elevation view showing the condiment holder engaged with the fin of the vehicle air vent, showing the fin in a second orientation and showing the condiment holder retained in a horizontal orientation for dispensing of condiment therefrom.

FIG. 13B shows that the air vent has been adjusted downwardly in the direction indicated by arrow "B" so that the vent fins "F" are no longer oriented substantially horizontally but are now facing downwardly toward the floor of the vehicle. The user is able to rotate the body 414 of the condiment holder upwardly in the direction indicated by arrow "C" so that the body 414 is horizontally oriented even though the fins "F" are not. The resistive force provided by flexible teeth 441a, 441b prevents the condiment holder 410 from sliding off fin "F". Additionally, the ball and socket joint is stiff enough that the body 414 is able to remain horizontally oriented. It will be understood that, in a similar fashion, if the air vent is adjusted to angle upwardly towards the ceiling of the vehicle, the user is able to rotate the body 414 of condiment holder 410 in the opposite direction to arrow "C" so that the body 414 will remain substantially horizontally oriented for use.

Figure 14A:
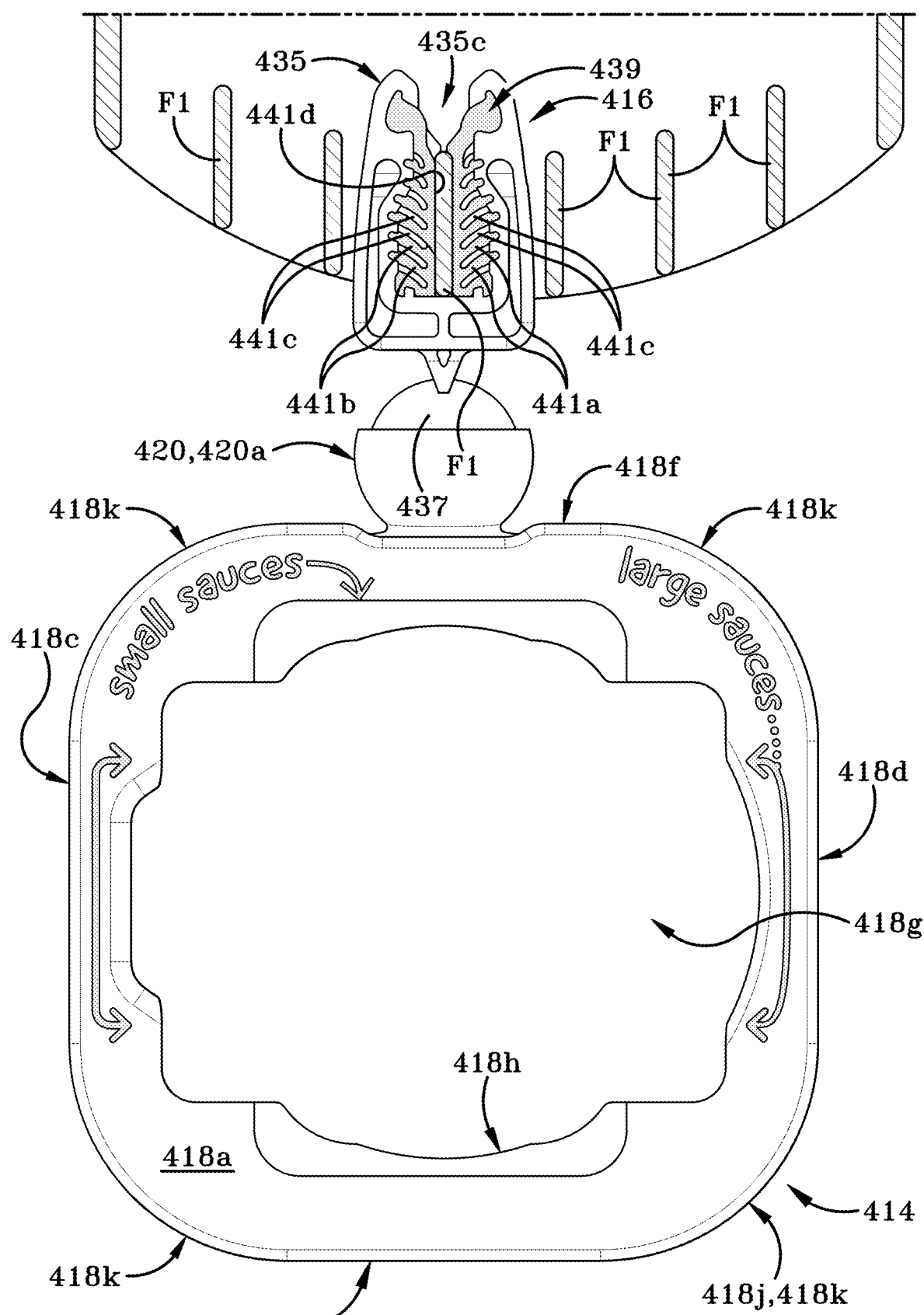
FIG. 14A is a top plan view showing the condiment holder operatively engaged with a vertically-arranged fin of an air vent of a vehicle, and showing the fin in a first orientation.

FIG. 14A shows an example of the condiment holder 410 being engaged with a vertically oriented vent fin "F1" (instead of a horizontally oriented fin "F" as in FIGS. 13A and 13B). Clip 416 is engaged with the vertically oriented vent fin "F1" by sliding that fin into the slit 441d defined between the first and second rows 441a, 441b of flexible teeth through recess 435c of housing 435. If the recess 435c is not correctly oriented for such engagement, the user may simply rotate clip 416 relative to body 414 to place the recess 435c in the correct position for engagement with fin "F1". When the condiment holder 410 is engaged with fin "F1", the body 414 will be oriented horizontally for use for dipping fries or nuggets or other foodstuffs into a condiment container retained by condiment holder 410.

Figure 14B:
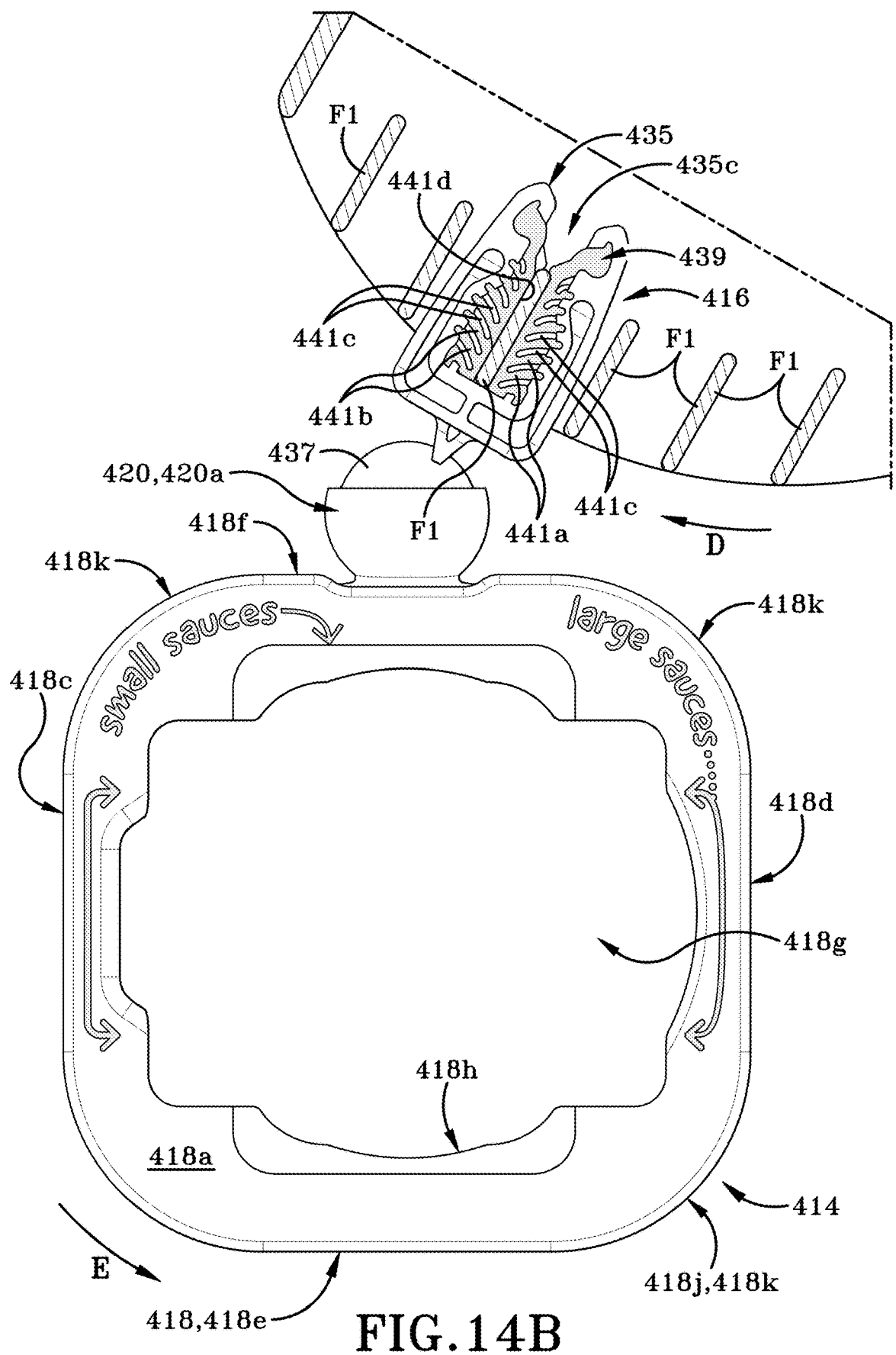
FIG. 14B is a top plan view showing the condiment holder engaged with the vertically-arranged fin of the vehicle air vent, showing the fin in a second orientation.

FIG. 14B shows an example of when the vehicle vent is adjusted to the left (as indicated by direction arrow "D"). The user is able it pivot the body 414 of condiment holder 410 so that the body 414 remains in an ideal position for use. The user will simply grasp the body 414 and pivot the same relative to the clip 416 in the direction indicated by arrow "E". It will be understood that, in a similar fashion, if the air vent is adjusted to angle towards the right instead of to the left, the user is able to rotate the body 414 of condiment holder 410 in the opposite direction to arrow "E" so that the body 414 will remain substantially horizontally oriented and in a desired position for use.

It will further be understood that while FIGS. 13A through 14B show the condiment holder 410 with the first surface 418a facing upwardly, the user can quickly and easily rotate the second surface 418b into the upward facing position as described previously herein. The desired condiment container can then be operatively engaged with the second surface 418b for use.

When any of the aforementioned condiment containers "CC1", "CC2" are is engaged with body 414, the consumer may remove a protective closure from the condiment container and thereby gain access to the condiment within the container. The protective closure may be removed before the body 414 is engaged with the air vent fin "F" or "F1" or after the body 414 is engaged with the air vent fin. If the user's own condiment container is engaged with the condiment holder 410, when the holder 410 is engaged with the air vent fin "F" or "F1" and the body 414 is in the desired position for use, the user may simply squeeze contents of a condiment packet into the condiment container and then use the same for dipping food.

Figure 15:
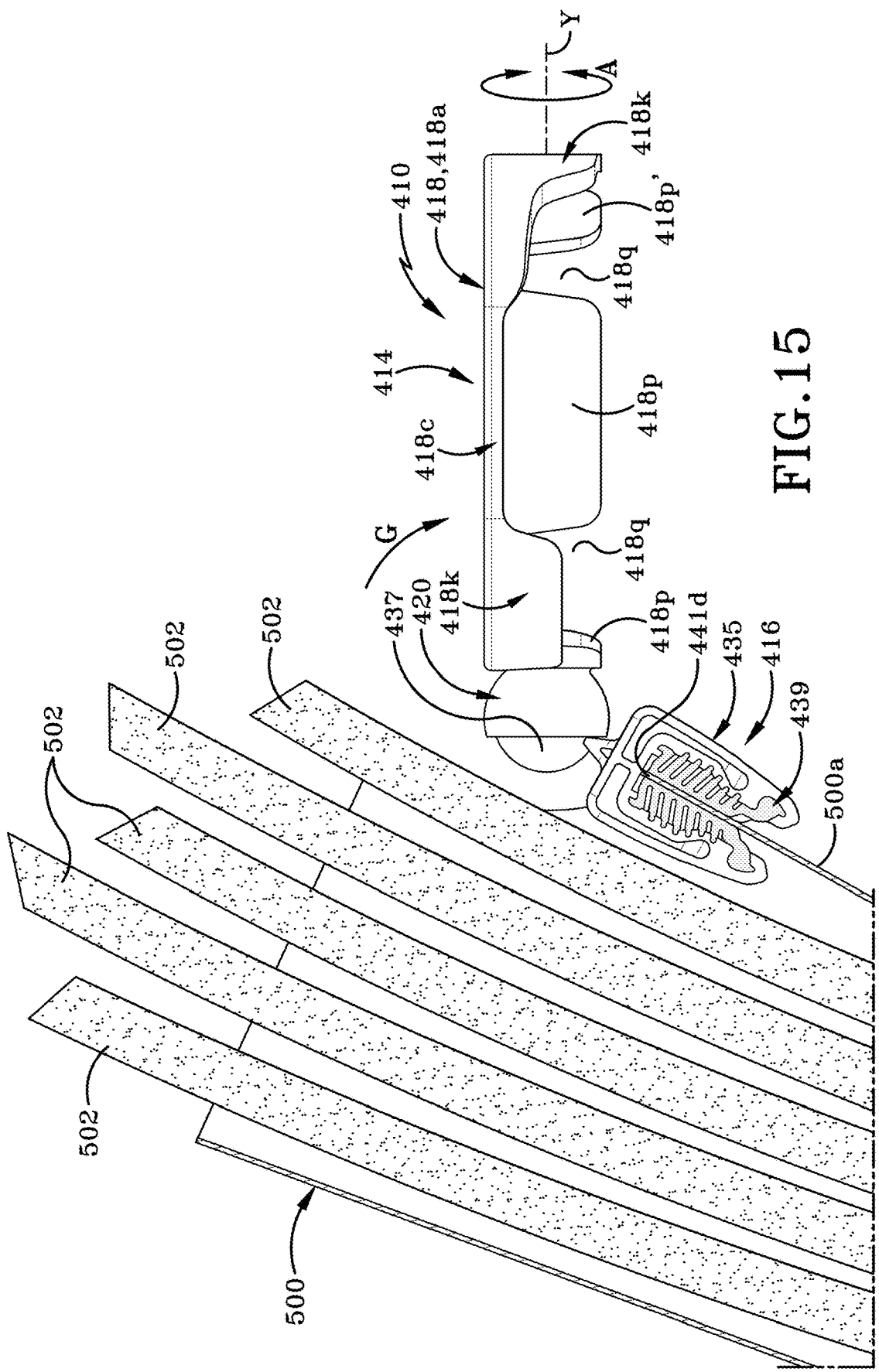
FIG. 15 is a vertical cross-section through a French fry container showing the condiment holder of FIG. 1 operatively engaged therewith.

The ball joint 420 and 437 offers a variety of benefits to condiment holder 410. When air vents droop down, countering the droop by adjusting the ball joint upwards allows for the holding member and therefore the sauce in the condiment container to sit level (i.e., generally horizontally in space). The ball joint accommodates any vent orientation (vertical louver/slats, slant vent louvers, and horizontal vent louvers). Not only can the condiment holder 410 be mounted on a fin of a vehicle air vent, the ball joint design and configuration of the clip 416 itself allows for the condiment holder 410 to alternatively be mounted to French fry boxes, chicken nugget boxes, dishes and plates. FIG. 15 by way of example, shows a box 500 holding a plurality of French fries 502 therein. Condiment holder 410 is illustrated as being operatively engaged with a wall 500a of the box 500 via clip 416. In particular, a region of wall 500a is received within the slit 441d of insert 439. The rows of flexible teeth 441a, 441b retain the clip 416 in place on wall 500a. FIG. 15 also shows that body 414 has been rotated relative to clip 416 in a direction indicated by arrow "G" such that the body 414 is oriented substantially horizontally in space. The body 414 is therefore in a suitable position for a user to select a French fry from box 500 and to then dip the French fry into a condiment in a condiment container (not shown) operatively engaged with body 414. In FIG. 15, condiment holder 410 is shown in an orientation where the first surface of body 414 will face upwardly in order to receive a condiment holder of a particular configuration, such as condiment container "CC1". If a different condiment container (such as condiment container "CC2") is to be engaged with body 414, then the user will rotate body 414 relative to clip 416 about the ball joint 420, 437, as indicated by arrow "A" to move body 414 from the first position (shown in FIGS. 1 and 15), to a second position (shown in FIG. 2).

It should be noted that the overmolded rubber grip (i.e., housing 435 and insert 439) of clip 416 tends to reduce the number of components required to securely engage the condiment holder 410 to a support surface (whether the fins "F" or "F1" or to a wall 500a of a French fry box 500 or to chicken nugget boxes, dishes or plates). The geometry and orientation of the rubber teeth 441a, 441b of insert 439 causes a type of "shark bite" reaction when engaged with a support surface, increasing the holding force to secure condiment holder 410 to its support surface. The ball joint design aids in keeping the holding member of the condiment holder 410 in a level orientation, i.e., generally horizontal in space, which provides an optimum angle for dipping of foodstuffs into the condiment retained within the condiment container "CC1", "CC2" engaged in holder 410.

Various inventive concepts are embodied as one or more methods, of which an example has been provided. The acts performed as part of the method is ordered in any suitable way. Accordingly, embodiments is constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments is practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements is present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, is used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device is otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" is used herein to describe various features/elements, these features/elements should not be limited by these terms, unless the context indicates otherwise. These terms is used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers is read as if prefaced by the word "about" or "approximately," even if the term does not expressly appear. The phrase "about" or "approximately" is used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A condiment holder comprising:
    a holding member having a first surface and an opposed second surface;
    wherein the holding member is selectively orientable between a first position and a second position;
    an aperture defined by an interior wall of the holding member, said aperture extending between the first surface and the second surface;
    at least one retaining wall extending outwardly from the second surface of the holding member; wherein the at least one retaining wall bounds and defines a compartment, and wherein the at least one retaining wall at least partially circumscribes the aperture;
    wherein when the holding member is in the first position, the aperture and/or interior surface of the holding member is adapted to operatively engage a first condiment container having a first configuration; and
    wherein when the holding member is in the second position, the compartment defined by the at least one retaining wall is adapted to operatively engage a second condiment container having a second configuration, and the second configuration is different from the first configuration.

2. The condiment holder according to claim 1, wherein the first position and the second position of the holding member are disposed at 180° to one another, wherein when the holding member is oriented in the first position the first surface is positioned vertically above the second surface, and when the holding member is rotated to the second position, the second surface is positioned vertically above the first surface.

3. The condiment holder according to claim 1, wherein the aperture is of a first shape and the at least one retaining wall is of a second shape, and the second shape differs from the first shape.

4. The condiment holder according to claim 1, wherein the at least one retaining wall is spaced a distance radially outwardly away from the interior wall such that a region of the second surface extends between the interior wall and the at least one retaining wall.

5. The condiment holder according to claim 1, wherein the aperture is generally rectangular in shape.

6. The condiment holder according to claim 1, wherein the at least one retaining wall is generally circular in shape.

7. The condiment holder according to claim 1, wherein the at least one retaining wall comprises at least two curved wall sections separated from one another by a gap, and wherein the at least two curved wall sections are concave in shape with respect to the interior wall.

8. The condiment holder according to claim 1, wherein the interior wall defines a set of first wall sections opposed to one another, and a set of second wall sections opposed to one another, and wherein the set of first wall sections is adapted to support part of the first condiment container having a first configuration; and wherein the set of second wall sections is adapted to support part of an additional condiment container having a different configuration from the first configuration.

9. The condiment holder according to claim 8, wherein the interior wall further defines a set of third wall sections opposed to one another, and wherein the set of third wall sections is adapted to support part of yet another additional condiment container having a different configuration from that of the additional condiment container and the first condiment container.

10. The condiment holder according to claim 9, wherein the interior wall further defines a fourth wall section and an opposed fifth wall section, and wherein the fourth wall section and fifth wall section are adapted to support part of at least one other condiment container having another configuration different from that of the first condiment container, the additional condiment container, and the yet another additional condiment container.

11. The condiment holder according to claim 1, further comprising a connector extending outwardly from the holding member, said connector being adapted to secure the holding member to a support surface.

12. The condiment holder according to claim 11, wherein the connector comprises a clip and a ball joint interposed between the clip and the holding member, wherein the ball joint enables the holding member to be rotated relative to the lip.

13. The condiment holder according to claim 11, wherein the ball joint comprises:
   a housing defining an interior space;
   an insert receivable in the interior space of the housing; and
   a plurality of flexible teeth provided on the insert.

14. A method of supporting a condiment container on a support surface comprising:
   providing a condiment holder;
   engaging a connector of the condiment holder with the support surface;
   selecting one of a first surface and a second surface of a holding member of the condiment holder to face upwardly;
   facing the first surface of the holding member upwardly when a first condiment container to be engaged with the condiment holder is of a first exterior shape; and
   facing the second surface of the holding member upwardly when a second condiment container to be engaged with the condiment holder is of a second exterior shape which is different from the first exterior shape.

15. The method according to claim 14, further comprising:
   inserting, when the first surface of the holding member faces upwardly, at least a portion of the first condiment container through an aperture defined in the holding member, wherein the aperture extends between the first surface and the second surface of the holding member; and
   retaining the first condiment container in place with a pair of opposed wall sections of an interior wall of the holding member which bounds and defines the aperture.

16. The method according to claim 15, further comprising:
   providing a plurality of first condiment containers each having a different configuration;
   selecting one of the plurality of first condiment containers for engagement with the holding member; and
   selecting a different pair of opposed wall sections on the interior wall from a plurality of opposed wall sections on the interior wall for engagement of the selected one of the plurality of first condiment containers.

17. The method according to claim 14, further comprising inserting, when the second surface of the holding member faces upwardly, the second condiment container into a compartment bounded and defined by at least one retaining wall extending outwardly from the second surface.

18. The method according to claim 14, wherein orienting the holding member further comprises rotating the holding member of the condiment holder relative to a connector of the condiment holder and about a longitudinal axis extending between a front wall and a rear wall of the holding member.

19. The method according to claim 14, further comprising:
   providing the support surface as a fin of a vehicle air vent; and
   frictionally retaining the connector to the fin via a plurality of flexible teeth.

20. The method according to claim 19, further comprising retaining the holding member generally horizontally in space regardless of an orientation of the fin with which the connector is engaged.

* * * * *